US 6,601,729 B1

(12) United States Patent
Papp

(10) Patent No.: US 6,601,729 B1
(45) Date of Patent: Aug. 5, 2003

(54) AUTOMATED PORTABLE MEDICATION RADIAL DISPENSING APPARATUS AND METHOD USING A CARRIER TAPE

(75) Inventor: Mary Anne Papp, Frankfort, IL (US)

(73) Assignee: Papp Enterprises, LLC, Fairview, PA (US)

( * ) Notice: Subject to any disclaimer, the term of this patent is extended or adjusted under 35 U.S.C. 154(b) by 0 days.

(21) Appl. No.: 09/612,721

(22) Filed: Jul. 10, 2000

Related U.S. Application Data

(63) Continuation-in-part of application No. 09/280,109, filed on Mar. 26, 1999.

(51) Int. Cl.[7] .................................................. G07F 11/66
(52) U.S. Cl. ......................... 221/25; 221/26; 221/197; 221/7; 206/528
(58) Field of Search ........................ 221/25, 26, 197, 221/7, 13, 76; 206/528, 534.1, 534.2, 532, 531, 533, 534

(56) References Cited

U.S. PATENT DOCUMENTS

| | | | |
|---|---|---|---|
| 3,143,207 A | | 8/1964 | Wagner |
| 3,329,080 A | | 7/1967 | Reach |
| 3,393,795 A | | 7/1968 | Covert, Jr. |
| 3,410,450 A | * | 11/1968 | Fortenberry .................. 221/7 |
| 3,450,306 A | * | 6/1969 | Gill .............................. 221/71 |
| 3,482,733 A | * | 12/1969 | Groves ......................... 221/25 |
| 3,654,890 A | | 4/1972 | Rigney et al. |
| 3,773,250 A | * | 11/1973 | Phillips ........................ 229/69 |
| 3,809,221 A | * | 5/1974 | Compere ..................... 206/461 |
| RE29,705 E | * | 7/1978 | Compere ..................... 206/531 |

(List continued on next page.)

OTHER PUBLICATIONS

European Search Report for European Patent Application EP 0030 2342.
Annex to European Search Report for EP 00 20 2342, including Abstract.
Carrier Tape by Advantek Inc. (Mar. 2000), pp. 1–2.
Cover tapes by Advantek Inc. (Mar. 2000), pp. 1–2.
LOKREEL packaging reels by Advantek Inc. (Mar. 2000), pp. 1–2.
ATR–1000 content, Advantek Inc., (Mar. 2000), p. 1.
3M production information: component handling & materials (Feb. 2000), pp. 1–4.
Modified Abstract, Search Report and Modified Search Report to Application No. 01301108.5–2308 (European Patent Office) dated Nov. 7, 2001.

*Primary Examiner*—Christopher P. Ellis
*Assistant Examiner*—Rashmi Sharma
(74) *Attorney, Agent, or Firm*—Vedder, Price, Kaufman & Kammholz

(57) ABSTRACT

A portable medication cartridge allows for both manual and automated dispensing of tablets or capsules of virtually all sizes through a radial dispensing apparatus. The cartridge may be sealed and encoded with medication and patient identification. A microprocessor controlled medication dispensing apparatus includes a cartridge magazine capable of holding a plurality of cartridges for the same or different patients. The portable medication dispensing apparatus and method detects patient identification data and activates a radial dispensing medication cartridge in response to verification of patient identification data. The radial dispensing medication cartridge may include, for example, a tablet carrier tape having a plurality of tablet packets with at least a partially open side. The tablet carrier tape accommodates different sizes and types of tablets or capsules and is sealed with a cover tape having an identification of the tablets. The cover tape is removed after the carrier tape is inserted into the dispensing medication cartridge. The medication is sequentially advanced and allowed to radially dispense through the open side of the tablet carrier tape from the medication cartridge.

36 Claims, 21 Drawing Sheets

U.S. PATENT DOCUMENTS

| | | | |
|---|---|---|---|
| 4,176,762 A | | 12/1979 | Scalera et al. |
| 4,572,403 A | * | 2/1986 | Benaroya ..................... 221/3 |
| 4,600,119 A | | 7/1986 | Olson |
| 4,695,954 A | | 9/1987 | Rose et al. |
| 4,725,997 A | | 2/1988 | Urquhart et al. |
| 4,733,797 A | * | 3/1988 | Haber ........................... 221/8 |
| 4,748,600 A | | 5/1988 | Urquhart |
| 4,785,969 A | | 11/1988 | McLaughlin |
| 4,847,764 A | | 7/1989 | Halvorson |
| 4,872,591 A | | 10/1989 | Konopka |
| 4,933,873 A | | 6/1990 | Kaufman et al. |
| 4,953,745 A | | 9/1990 | Rowlett |
| 4,970,669 A | | 11/1990 | McIntosh et al. |
| 5,036,462 A | | 7/1991 | Kaufman et al. |
| 5,047,948 A | | 9/1991 | Turner |
| 5,084,828 A | | 1/1992 | Kaufman et al. |
| 5,102,008 A | | 4/1992 | Kaufman et al. |
| 5,110,007 A | * | 5/1992 | Law et al. ..................... 221/25 |
| D328,133 S | | 7/1992 | Kaufman et al. |
| 5,133,477 A | * | 7/1992 | Etheredge, III et al. ...... 221/25 |
| 5,163,559 A | * | 11/1992 | Bunin ........................ 206/532 |
| 5,176,285 A | | 1/1993 | Shaw |
| 5,197,632 A | | 3/1993 | Kaufman et al. |
| 5,230,441 A | | 7/1993 | Kaufman et al. |
| 5,244,091 A | * | 9/1993 | Tannenbaum ............... 206/462 |
| 5,267,174 A | | 11/1993 | Kaufman et al. |
| 5,299,902 A | * | 4/1994 | Fujiwara et al. ............. 414/416 |
| 5,329,459 A | | 7/1994 | Kaufman et al. |
| 5,335,816 A | | 8/1994 | Kaufman et al. |
| 5,405,011 A | * | 4/1995 | Haber et al. ................. 206/531 |
| 5,442,728 A | | 8/1995 | Kaufman et al. |
| 5,454,900 A | * | 10/1995 | Han et al. ................... 156/584 |
| 5,472,113 A | | 12/1995 | Shaw |
| 5,531,859 A | * | 7/1996 | Lee et al. .................... 156/584 |
| 5,566,829 A | * | 10/1996 | Cotilletta .................... 206/581 |
| 5,609,268 A | | 3/1997 | Shaw |
| 5,657,198 A | | 8/1997 | Flener |
| 5,706,952 A | | 1/1998 | Bianca et al. |
| 5,755,357 A | * | 5/1998 | Orkin et al. ................... 221/82 |
| 5,762,754 A | * | 6/1998 | Kondo et al. ............... 156/564 |
| 5,782,786 A | * | 7/1998 | Tomaiuolo .................. 602/241 |
| 5,860,419 A | | 1/1999 | Davies et al. |
| 5,868,135 A | | 2/1999 | Kaufman et al. |
| 5,873,360 A | | 2/1999 | Davies et al. |
| 5,909,822 A | * | 6/1999 | George et al. ................ 221/25 |
| 5,938,996 A | | 8/1999 | Bianca et al. |
| 5,945,651 A | | 8/1999 | Chorosinski et al. |
| 5,963,136 A | | 10/1999 | O'Brien |
| 5,971,594 A | | 10/1999 | Sahai et al. |
| 6,004,020 A | | 12/1999 | Bartur |
| 6,021,918 A | | 2/2000 | Dumont et al. |
| 6,032,666 A | | 3/2000 | Davies et al. |
| 6,062,420 A | * | 5/2000 | Krouwel et al. ................ 221/5 |
| 6,138,865 A | | 10/2000 | Gilmore |
| 6,150,942 A | | 11/2000 | O'Brien |
| 6,155,454 A | | 12/2000 | George et al. |
| 6,161,095 A | | 12/2000 | Brown |
| 6,162,007 A | * | 12/2000 | Witte ........................ 414/416 |
| 6,168,563 B1 | | 1/2001 | Brown |
| 6,193,103 B1 | * | 2/2001 | Clarijs ........................ 221/25 |
| 6,198,383 B1 | | 3/2001 | Sekura et al. |
| 6,202,642 B1 | | 3/2001 | McKinnon et al. |
| 6,206,233 B1 | * | 3/2001 | Schulze ....................... 221/25 |
| 6,234,343 B1 | * | 5/2001 | Papp ............................ 221/7 |
| 6,321,817 B1 | * | 11/2001 | Kubota et al. .............. 156/584 |
| 6,378,519 B1 | | 4/2002 | Davies et al. |

\* cited by examiner

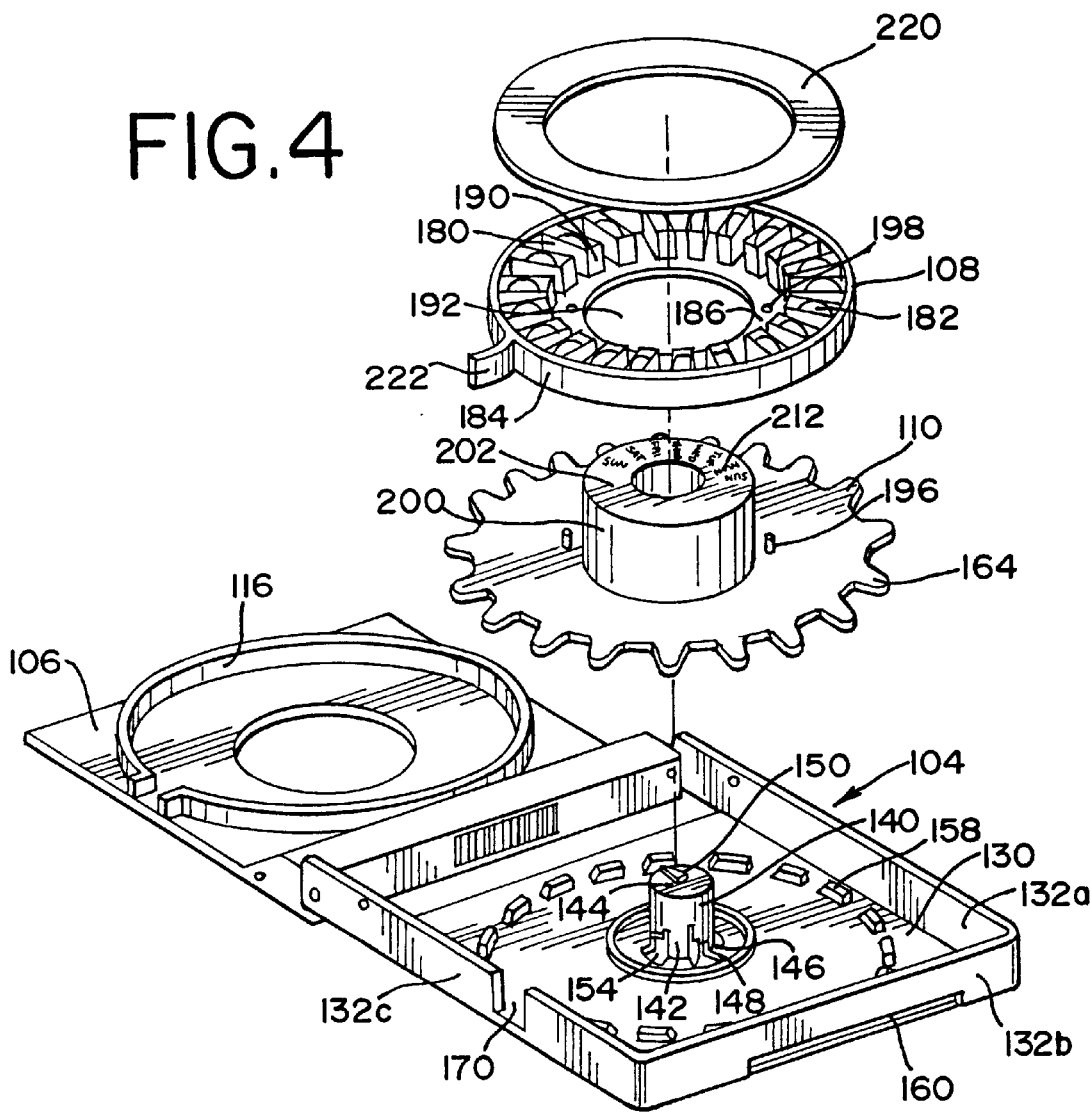
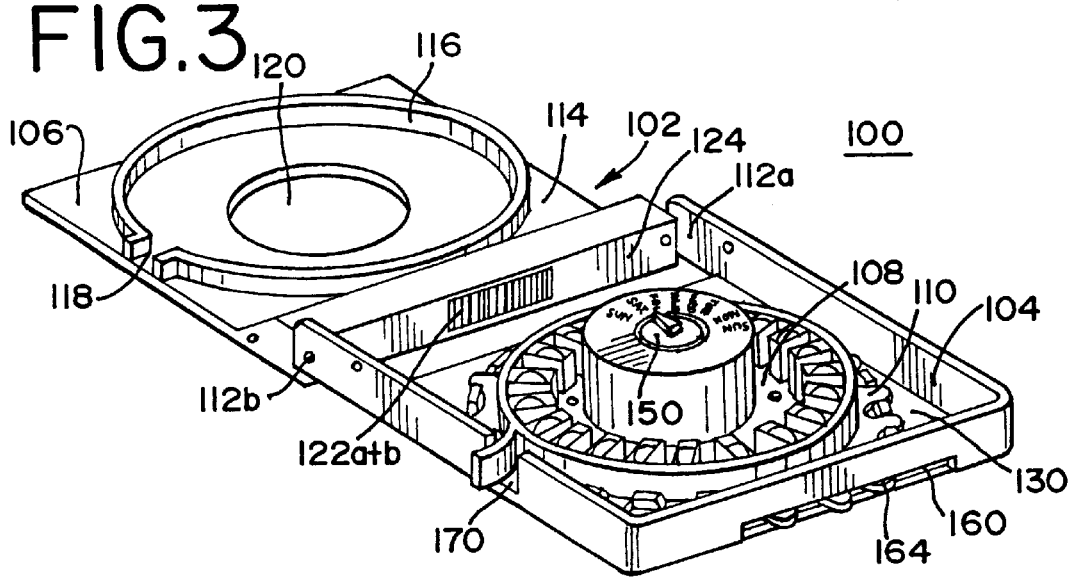

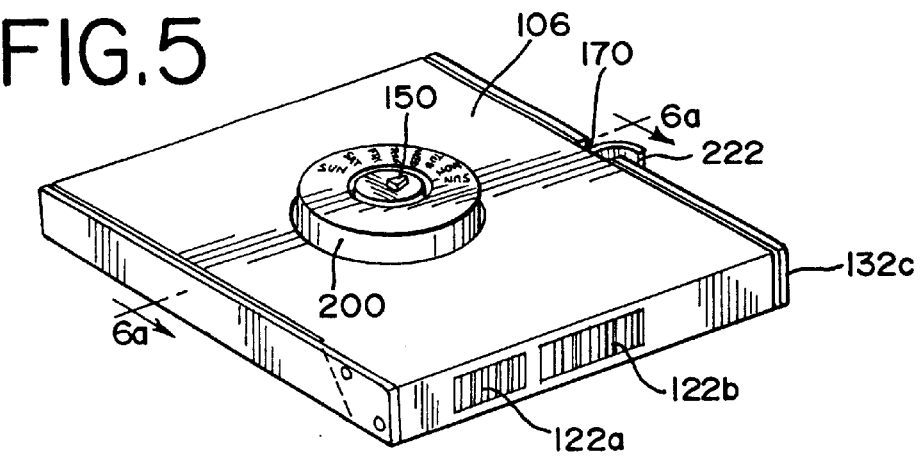
FIG. 5
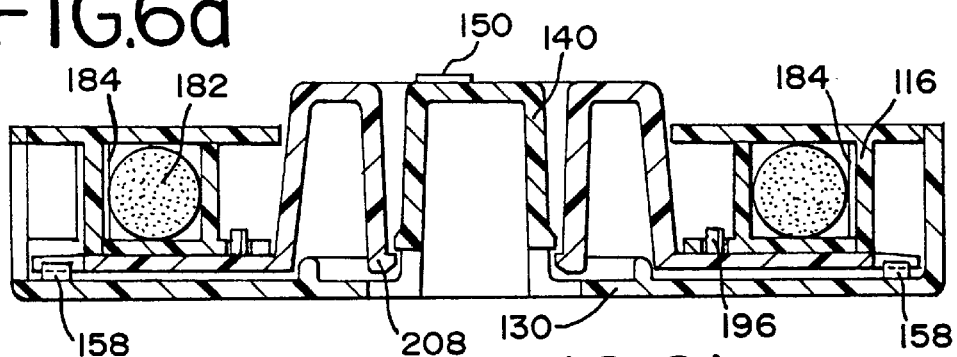
FIG. 6a
FIG. 6b
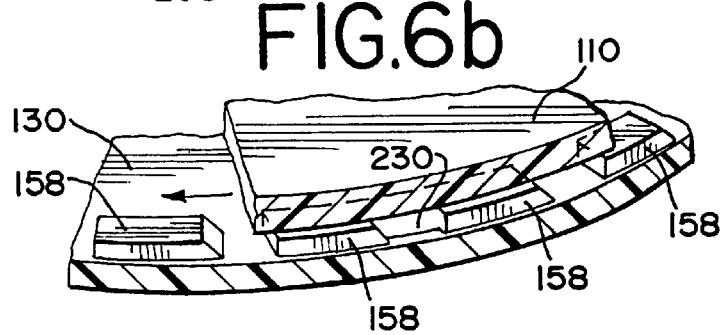
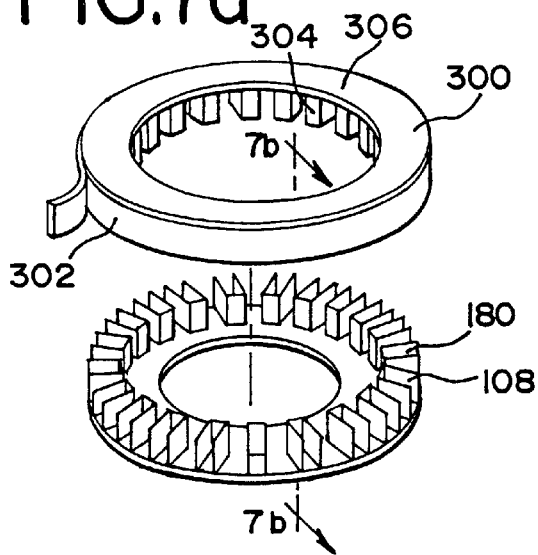
FIG. 7a
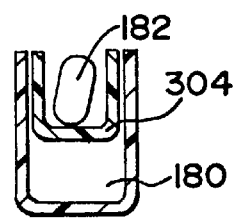
FIG. 7b

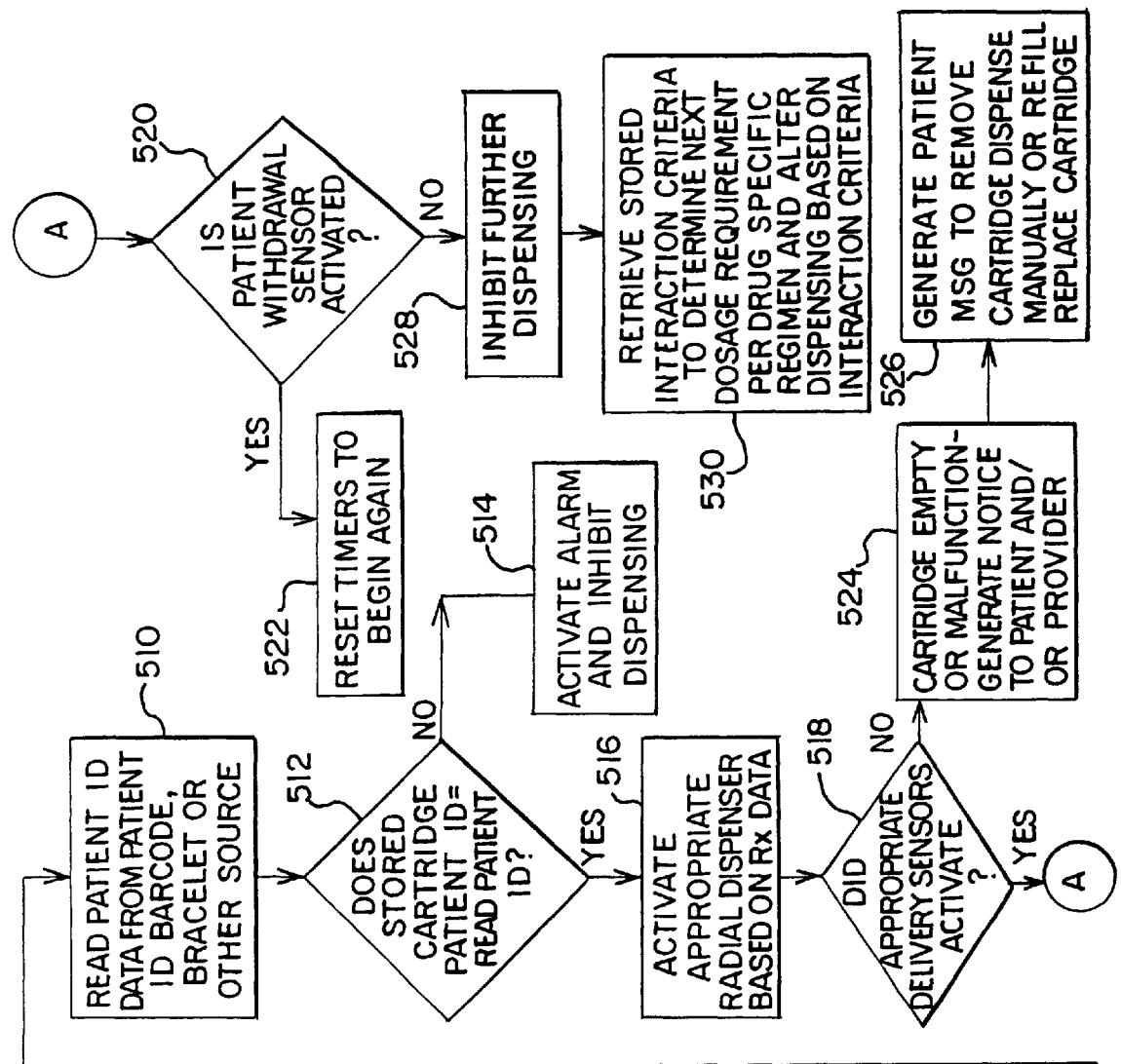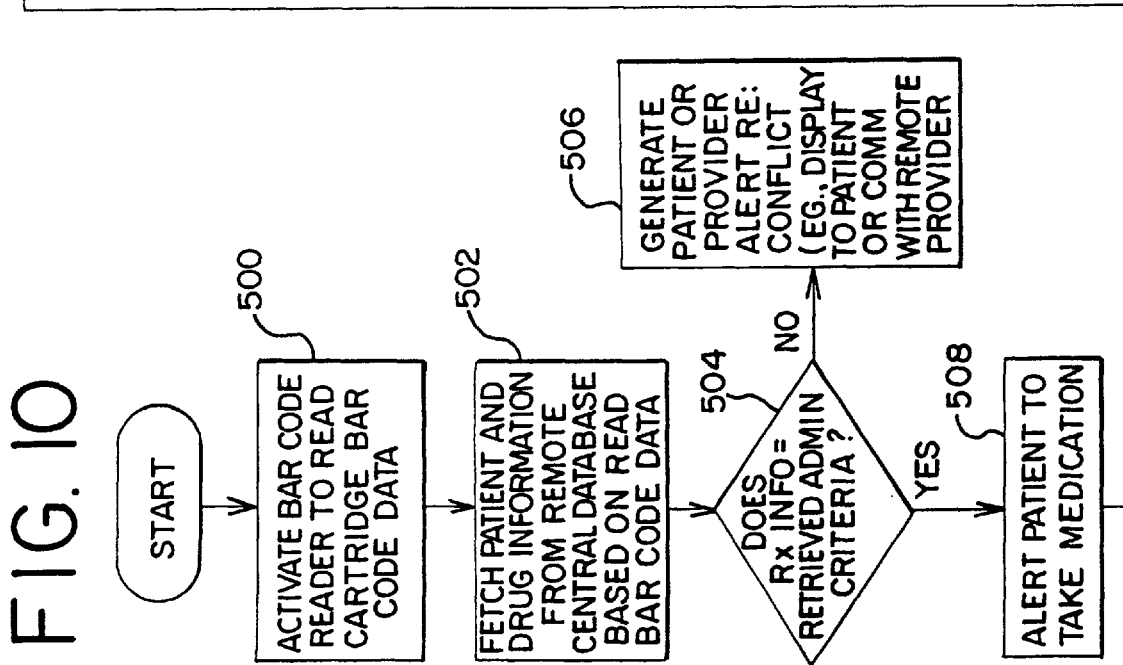
FIG. 10

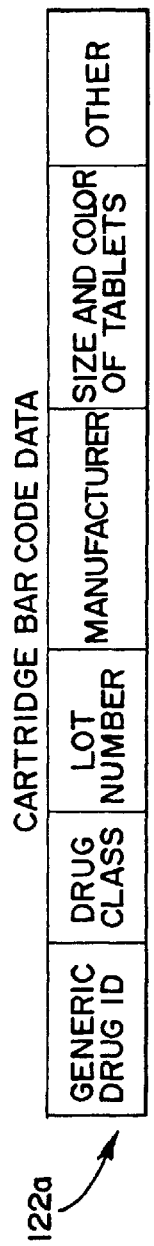
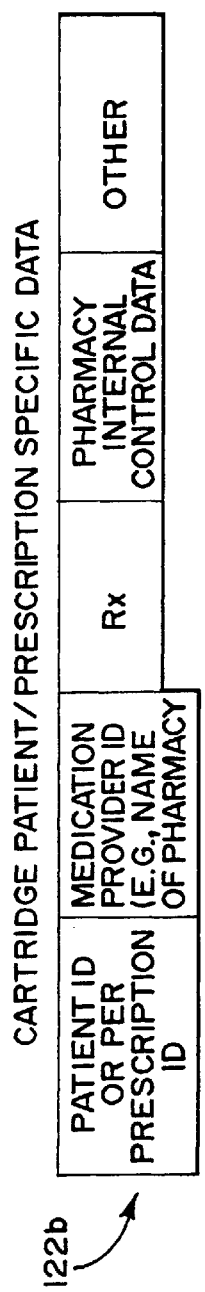
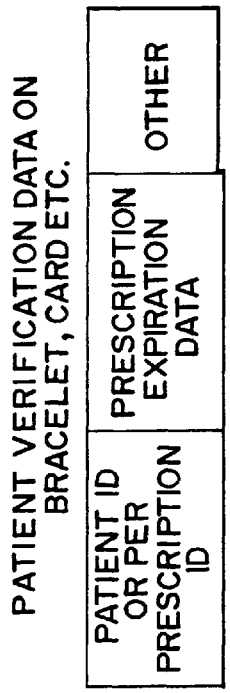
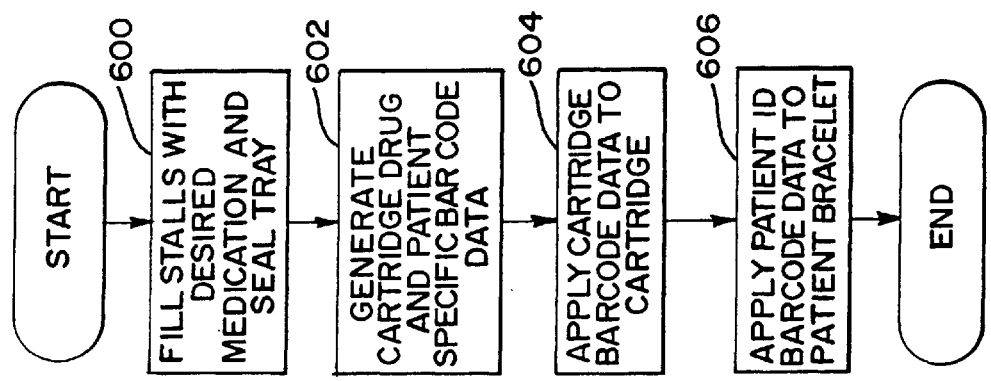

AUTOMATED PORTABLE MEDICATION RADIAL DISPENSING APPARATUS AND METHOD USING A CARRIER TAPE

CROSS REFERENCE TO RELATED APPLICATIONS

This application is a continuation-in-part application of serial No. 09/280,109, filed Mar. 26, 1999.

FIELD OF THE INVENTION

The invention relates generally to systems and methods for facilitating patient prescription compliance and for dispensing medication and more particularly to portable medical dispensing apparatus and methods with patient compliance control.

BACKGROUND OF THE INVENTION

Patient non-adherence to prescribed medication regimens is high, with non-adherence rates among geriatric patients ranging 40–75% according to several studies. Multiple factors contribute to non-adherence including visual, auditory, and cognitive impairments, as well as polypharmacy, poly-providers, and visit and refill compliance,. Drugs not taken, or taken incorrectly, incur the same healthcare costs as fully adherent regimens, but without the expected medical outcome. One recent study reported that non-adherence to medication regimens accounted for 18% of hospitalizations in the elderly. In addition to the needs of the elderly, the identification and documentation requirements for medication administration in schools, workplaces and assisted living facilities have increased. As such, many attempts have been made to provide prescription reminder systems and methods as well as medication delivery systems for patients who may benefit from monitored medication dispensing. For example, systems are known which provide patients with alert devices to remind patients of when to take medication, and how much medication to take. In addition, there are various systems that protect patients from over-dosage and underdosage and attempt to improve patient compliance using such devices as unit dose containers, timing mechanisms, and sensors to detect patient use. These interventions may require labor-intensive filling and monitoring as well as on-site reprogramming to allow for interval changes in medical regimen. Positive identification of the medication in the dispensing unit from pharmacy to point of use would be more desirable.

A preferred system would also include patient identification information that may be read by a medication dispensing unit or provider. The medication-dispensing unit may then dispense the appropriate allowance of medication to the matched recipient at an appropriate time under microprocessor control. Such dispensing units could be remote from a main unit of a health care provider, such as a physician, hospital or other health care provider. The health care provider may communicate with the patient through the dispensing unit to provide prescription information, drug interaction information, dosing change and other feedback as desired. The software programs to provide such control exist in the public domain, and have been used by institutions to monitor safety and compliance. However, the dispensing units employed are geared to high volume institutional use.

Prior home dispensing systems typically are not readily portable, and do not provide a relative cost effective and easy mechanism to dispense medication. Filling and refilling may require in-home assistance. Transfer of medication from a pharmacy or provider-labeled containers may be required, introducing the possibility of medication identification errors. Also, conventional systems do not match the identities of the prescriptions to the patient. For example, they do not typically verify that the patient receiving the medication is the suitable recipient of the prescribed medication. Consequently, there exists a need for an improved portable medication dispensing apparatus and method.

BRIEF DESCRIPTION OF THE DRAWINGS

FIG. 3 is a perspective view of one example of a radial dispensing medication cartridge in accordance with one embodiment of the invention.

FIG. 4 is an assembly view of one example of a radial dispensing medication cartridge in accordance with one embodiment of the invention.

FIG. 5 is a perspective view of the radial dispensing medication cartridge of FIG. 3 with the cover closed.

FIG. 6a is a cross-sectional view of the radial dispensing medication cartridge of FIG. 5.

FIG. 6b is a cutaway partial cross-sectional view showing interacting teeth for the cartridge in accordance with one embodiment of the invention.

FIG. 7a is an illustration of an example of a tablet stall insert and an associated, tablet tray in accordance with one embodiment of the invention.

FIG. 7b is a cross-sectional view of the tablet stall insert, inserted into the tablet tray shown in FIG. 7a.

FIG. 10 is a flow, chart illustrating one embodiment of the operation of the medication dispensing apparatus illustrated in FIGS. 2 and 8 in accordance with one embodiment of the invention.

FIG. 11 is a flow chart illustrating the operations that may take place, for example, with a provider to fill and suitably provide a tablet tray in accordance with one embodiment of the invention.

FIGS. 12a and 12b are graphic representations of examples of cartridge bar code data and cartridge patient/prescription-specific data that may be placed on a cartridge in accordance with one embodiment of the invention.

FIG. 12c is a graphic representation of an example of patient data that may be used to verify that the correct patient is receiving the medication.

DETAILED DESCRIPTION OF A PREFERRED EMBODIMENT OF THE INVENTION

Figure 1:
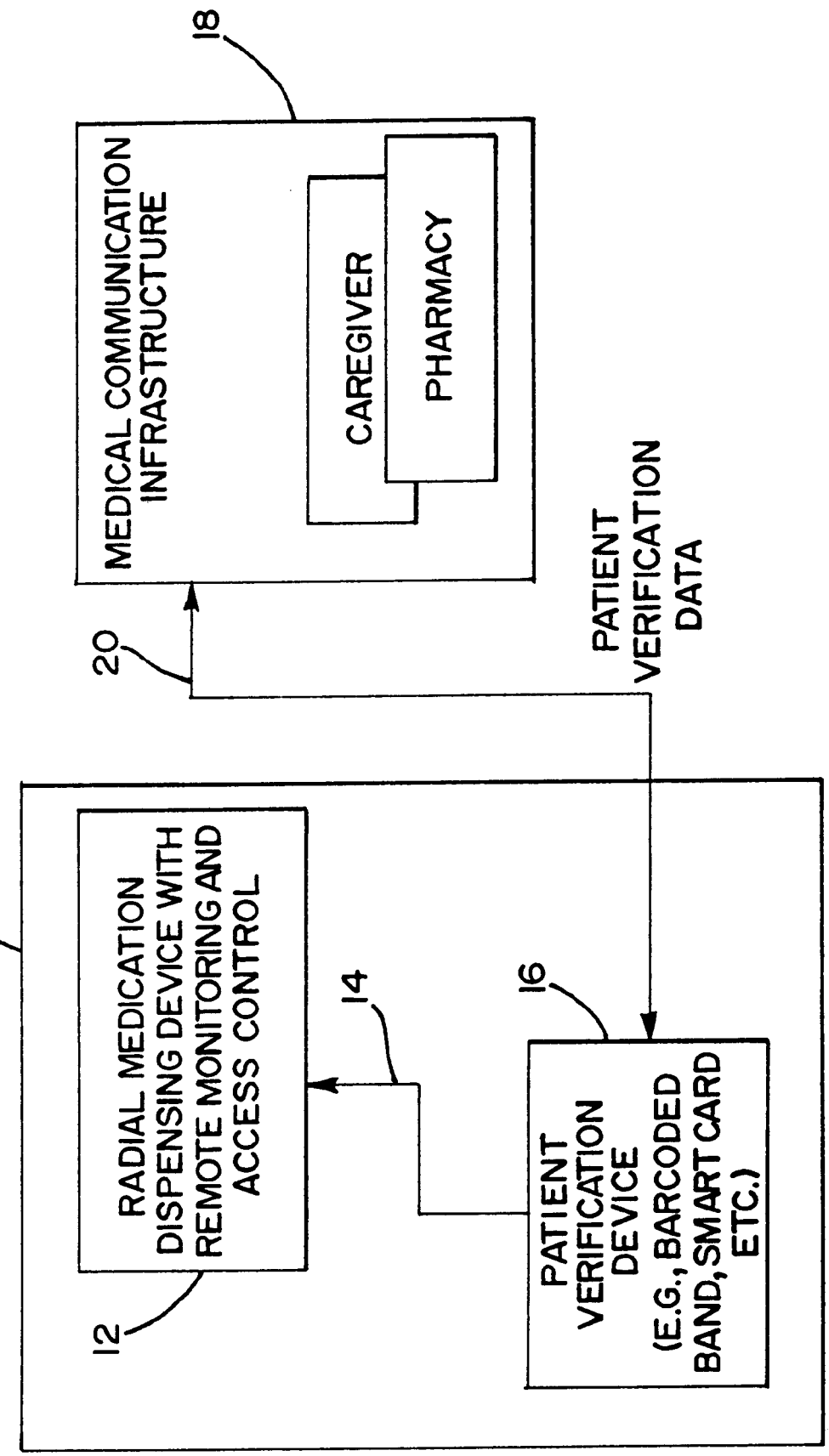
FIG. 1 is a block diagram illustrating one example a radial medication dispensing device with remote monitoring and access control in accordance with one embodiment of the invention.

Briefly, a portable medication cartridge allows for both manual and automated dispensing of tablets or capsules of virtually all sizes through a radial dispensing apparatus. The cartridge may be sealed and encoded with medication and patient identification. A microprocessor controlled medication dispensing apparatus includes a cartridge magazine capable of holding a plurality of cartridges for the same or different patients. The portable medication dispensing apparatus and method detects patient identification data and activates a radial dispensing medication cartridge in response to verification of patient identification data. The radial dispensing medication cartridge may include, for example, a tablet tray having a plurality of tablet stalls with at least a partially open top and side. The tablet and tray accommodates different sizes and types of tablets or capsules. A temporary tablet retention band is removably attached to the table tray to keep the tablets tray from exiting the open side of the tablet tray until the tablet tray is suitably filled and later inserted into the dispensing medication cartridge. In one embodiment, the radial dispensing medication cartridge includes a rotational tablet dispenser adapted for rotational advancement of medication, such as tablets, and radial dispensing of the medication from the cartridge. The removable tablet retention band is extracted after the table tray is properly inserted into the medication cartridge. The medication is sequentially advanced and allowed to radially dispense through an open side of the tablet tray from the medication cartridge.

In one embodiment, the medication dispensing apparatus includes a radial dispensing medication cartridge magazine that holds a plurality of medication cartridges to accommodate differing medications or patients. The medication dispensing apparatus includes a suitable processing device and remote interface to allow a provider to directly communicate with the apparatus and allow the patient to provide information or respond to questions through a keypad speaker or other suitable interface. In addition, the processor controls dispensing of medication from the radial dispensing medication cartridge at an appropriate time and in appropriate amounts based on either preprogrammed timing information, information communicated remotely to the device, or from a patient identification device such as a bar coded wrist band, encoded card or other suitable patient identification mechanism. The device may also communicate with patient wearable alert mechanisms such as wrist watches or pagers.

In one embodiment, the radial dispensing medication cartridge magazine is downwardly sloped along with an associated angled tablet chute so that the radially dispensed tablets travel down the chute and subsequently to a common tray where the tablets may be extracted for consumption. The tray may be removable with a plurality of electronically identified compartments to hold a day's medication. A processor actuates one or more radial dispensing medication cartridges. If desired, dispensing may be controlled remotely by a caregiver through a remote communication interface. The remote communication interface may include, for example, a bar code reader that may read both a bar code on a patient bracelet and also read bar code medication information on each cartridge so that the system can determine the type of medication within each cartridge and confirm the identity of the patient. The medication barcode data on the cartridge also preferably includes dosage and frequency data that is read by the processor and provides medication specific administration criteria to be communicated to the device to accommodate variances in administration schedules.

In one embodiment, the radial dispensing medication cartridge includes a manual activation surface, such as a knob or other surface, to facilitate manual radial dispensing, of medication from the cartridge when the cartridge is removed from the magazine. The radial dispensing medication cartridge may also include a separate surface adapted to engage with an actuator during automated radial dispensing of medication in the cartridge when the cartridge is in the magazine.

Compliance is monitored through sensors located in the magazine at each cartridge location and in the patient extraction tray. The device's medication administration criteria are reset when the sensors are activated at both locations. Alternatively, or in addition, cameras can be used to verify medication consumption.

FIG. 1 is a block diagram showing a medication dispensing and compliance system 10 having a radial medical dispensing device 12 that receives patient verification information 14 from a patient verification device 16. A medical communication infrastructure 18 may communicate over a suitable communication link 20 with the radial medication dispensing device 12.

The radial medication dispensing device may have, for example, remote monitoring capabilities to allow healthcare providers or computers 18 to monitor information on patient medication compliance or noncompliance as well as control medication access. This allows, for example, a remote caregiver to adjust or cancel a medication regimen.

The medical communication infrastructure 18 may be simply a nursing station, or a more complex medical infrastructure that may include integrated order entry, results retrieval and pharmacy management components. For example, the medical communication infrastructure 18 may be the Veterans Administration Health Information System and Technology Architecture (VISTA). The architecture and features of such a system may be obtained for example from Hines Hospital Veterans Administration, FOIA Office, Hines, Ill. As such, a pharmacist at a pharmacy, a doctor, computer or other personnel may communicate with the patient through a speaker, display or other suitable mechanism to Wither provide additional information, receive feedback information from the patient, from the radial medication dispensing device or provide instructions, dosage or any other suitable information from a remote location.

The patient verification device may be any suitable mechanism (or mechanisms) that provides some patient verification information 14, such as a patient's name, social security number, or a prescription number, in a manner to match data on a bar-coded on the medication cartridges. The radial medication dispensing device 12 then confirms that the person accessing the machine is the patient. For example, the patient verification device may include a bracelet with a bar code, a watch with an infrared communication link, a smartcard, or any other suitable mechanism that can provide requisite patient identification information.

Figure 2:
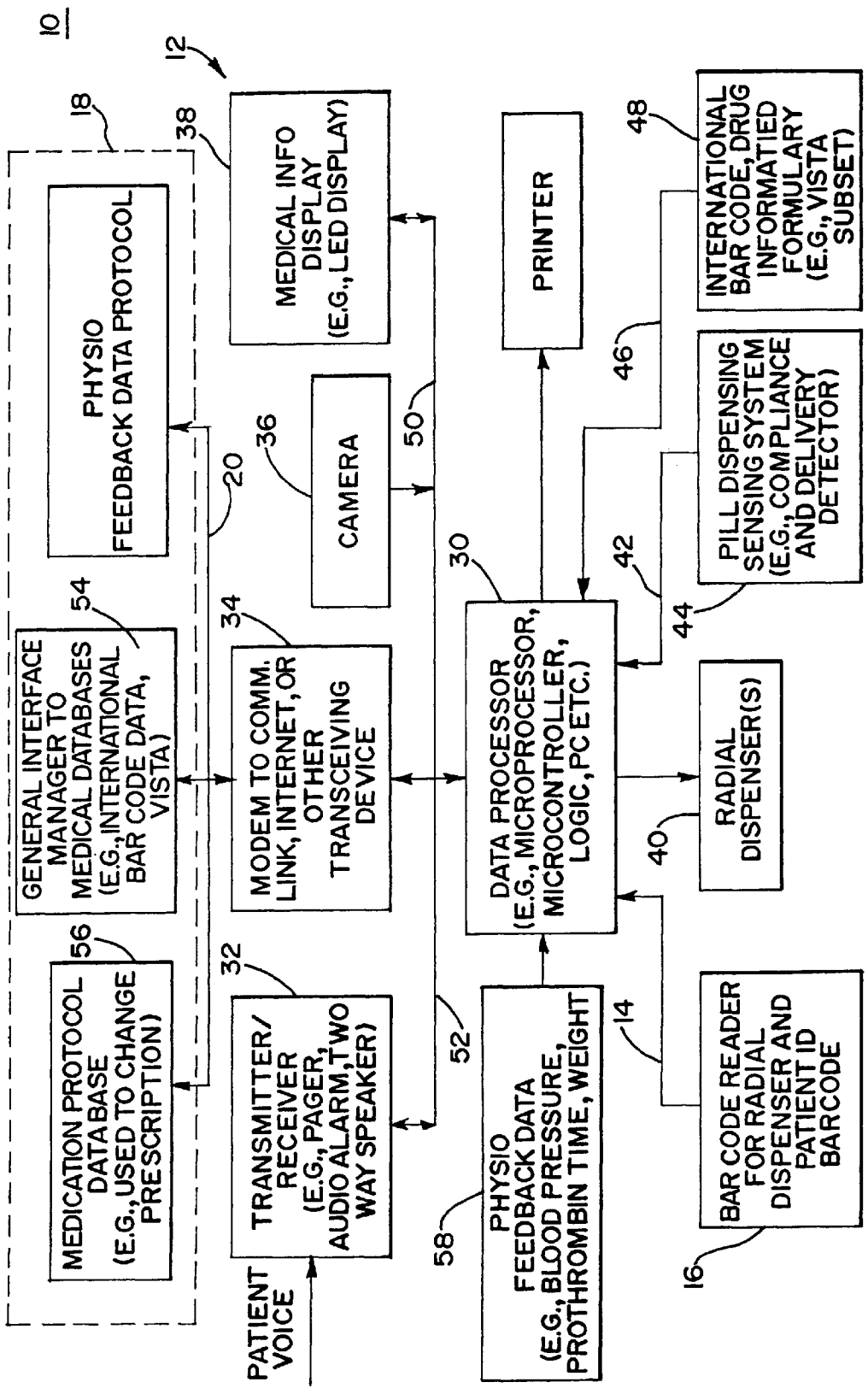
FIG. 2 is a block diagram illustrating one example of a radial medication dispensing device with remote monitoring and access control in accordance with one embodiment of the invention.

FIG. 2 shows an embodiment of the medication dispensing and compliance system 10 that employs a radial medication dispensing device 12 having a data processor 30 operatively coupled to an information transmitter and/or receiver 32, a modem 34 or other communication interface device, a camera 36 and a medical information display 38, such as an LCD display or other suitable display device. The processor 30 is also operatively coupled to the patient verification device 16 which may be, for example, a bar code reader for a radial dispenser and/or a bar code reader for a patient identification bar code. The data processor 30 is also operatively coupled to control one or more radial dispenser actuators 40 that may be part of the radial dispenser. The data processor 30 also receives pill dispensing detection data 42, such as whether tablets have been suitably dispensed, from a cartridge tablet sensing system 34 and verify that they have been removed through sensors in the receiving tray. The data processor 30 may also receive control or medication information 46 from an international or other standardized medication database such as the International Pharmaceutical Bar Code Association database and the National Patient Medication Information software or local pharmacy software which provides drug interaction information as well as patient information to the data processor. The medication information source 48 may also be suitably coupled to the modem 34 or to any other suitable connection to provide the data processor 30 with the requisite medical information required by the radial medication dispensing system.

The data processor 30 may be any suitable microprocessor, microcontroller, logic, state machine or other suitable circuit that may employ software control or hardware control or a suitable combination thereof to facilitate the dispensing of medication from the radial dispensing device. The transmitter and/or receiver 32 may be a pager, audio alarm, speaker or any other suitable device that may receive a patient's voice or transmit a caregiver's voice or other information to facilitate compliance, monitoring, emergency information or any other suitable information as required. The modem 34 provides an interface between the medical communication infrastructure 18 and the data processor 30 so that suitable information can also be communicated. Communication may occur over any suitable communication link 20 which may be, for example, a network link, a wireless communication link, telephone line or landline communication or other suitable link.

The camera 36 may be any suitable camera that may be located, for example, in the patient's home or office through which video information 50 is passed from the camera through the modem or to the data processor 30 as feedback information so that a caregiver can monitor exactly how the radial dispensing apparatus is being used, or can visually view the medication beings removed from the tray or any other suitable monitoring, if desired. The medical information display 38 displays, for example, medical information relating to the medication in the radial dispensing apparatus. For example, the medical information that may be displayed by the data processor may include information relating to the dosage, conditions for administration (fasting, with water, etc.), information sent by a medical communication infrastructure 18 indicating drug interaction information or any other suitable information including, for example, refill alerts and instructions, or visit reminders. The data processor 30 communicates with the transmitter/receiver 32, the modem 34, the camera 36 and the medical information display 38 through a combination of suitable busses or links generally indicated at 52.

The medical communication infrastructure 18 may include, for example, a General Interface Manager 54 to access multiple programs at a number of sites or a dedicated medication protocol computer 56, such as a Warfarin Adjustment protocol medical computer as known in the art that is used to change prescriptions so that the dosages or medication dispensed by the radial dispenser are changed on a per cartridge basis and per patient basis, if desired. The databases may include, for example, international pharmaceutical bar codes, drug identification and interaction allergy tracking, drug administration criteria (dosage, etc.) and patient medical information indexed by patient ID. The physiofeedback data 58 are, for example, blood pressure, weight, glucose levels, protimes from the patient, that also may be coupled and communicated through the data processor 30 or any other suitable information that may be used by a caregiver to determine whether a patient's reaction to the medication is within acceptable parameters. As such, a blood pressure monitor, scale or other suitable physiodata provider is operatively coupled to the processor 30. Keypad entry may also be used to enter queries or data.

FIG. 3 illustrates one example of a radial dispensing cartridge 100 that includes a housing 102 having a base 104, a cover 106, a tablet tray 108 and a rotational member 110. In this embodiment, the housing 102 is configured as a box-like housing with a hinge arrangement for coupling the base 104 with the cover 106. For example, the cover 106 is hingedly attached to the base 104 through protrusions in corresponding detents indicated generally at 112a and 112b. However, it will be recognized that any suitable coupling of the base to he cover may be used, Also, the hinge may also be coupled to another side of the base.

The housing 102 may be made from plastic or any other suitable materials. The cover 106 has an inner surface 114 from which a tablet retaining wall 116 protrudes. Tablet retaining wall 116 projects generally upwardly from an inside surface of the cover 106 when the cover is open as shown. The tablet retaining wall 116 may be a circular retaining wall or any other suitable shape that retains tablets within a tablet tray 108 when the cover 106 is closed. The tablet retaining wall 116 includes an opening 118 through which tablets are radially dispensed. In this embodiment, the tablet retaining wall is integrally molded as part of the cover 106. The cover 106 also includes, if desired, an aperture 120 through which a manual activation surface may protrude to allow manual tablet dispensing.

The cover 106 may also include patient identification data 122b such as a bar code label or other mechanism that contains, for example, the name of the patient, the type of medication in the cartridge, the prescription, or any other suitable information. In this example, the bar code label includes identifying data from the International Pharmaceutical Bar Code Association database. Also, in this embodiment, the patient identification data 122b or other suitable data is placed on an outer surface of the housing 102. The patient identification data 122b, shown in the form of a bar code label, is placed on an end 124 of the housing 102 wherein the end is part of the cover 106 (in this example on the hinge mechanism). However, it will be recognized that the patient identification data 122b in its various forms may be placed at any suitable location on the medication cartridge which allows a data reader to obtain the information for use in properly identifying a medication user and for dispensing medication as described below.

Referring to FIGS. 3 and 4, the base 104 of the medication dispensing cartridge 100 includes a support surface 130, a top sidewall 132a, sidewall 132b and bottom sidewall 132c. The support surface 130 is a substantially flat member which serves to carry and support the tablet tray 108 and rotating member 110.

Located substantially centrally on flat support surface 130 is a raised hub 140. Hub 140 has a generally cylindrical configuration and in this instance may have eight spoke-like elements forming a ring about its circumference. Four of these spokes are support spokes 142 which extend generally vertically from flat support surface 130 to the raised upper portion 144 of hub 140 so that the hub is essentially upstanding on four legs. Projecting generally downwardly from upper portion 144 and spaced alternately between support spokes 142 are four resilient, spring-like spokes 146 which do not extend completely down to the flat inner surface 132. A small spherically shaped protuberance 148 is located in a lower end of resilient spokes 146 and cooperates with resilient spokes 146 to provide an attachment for rotating member 110 to the support surface 130.

An optional pointer 150 is located on the flat upper portion 144 of the hub, the pointer being molded integrally with the hub for economies of manufacture. In this instance, the pointer 150 points along the latitudinal axis of surface 130 but may be designed to point in other directions when desirable. In addition, other mechanisms to designate to the user which tablet is to be taken may be employed. The pointer 150 may be used, for example, when the medication dispensing cartridge 100 is used as a manual dispensing device. Support 130 also includes an annular ridge 154 spaced a short distance from hub 140 and surrounding the hub: The ridge 154 is a small protuberance or projecting ring integrally formed in a flat portion of the support 130 and serves to locate and position the rotating member 110 when attached to the base 104.

A first set of ratchet teeth 158 upstands from the support surface 130. The set includes an array of teeth, there being the same number of teeth 158 to correspond with the number of tablets included in the tablet tray 108. Accordingly, the number of ratchet teeth may vary according to the design and purpose of the tablet tray. As currently structured, the radial dispensing cartridge individually radially dispenses one tablet at a time. For individual dispensing purposes, the number of ratchet teeth 158 will thus correspond with the number of tablets. Each tooth 158 is essentially an elongated raised protuberance on the surface of the support 130, and includes an inclined edge which forms an angle with respect to the flat portion of the support. As illustrated, the teeth 18 are intermittently spaced in a circularly oriented array. The ratchet mechanism and hub may be of a similar design described in U.S. Pat. No. 4,165,709 entitled "Tablet Dispenser" issued to John A. Studer, Aug. 28, 1979.

The base 104 also includes a slot 160 wherein at least a portion of the rotating member 110 extends through the slot 160 to expose engageable surfaces to an actuating member. The engageable surfaces in this embodiment, are shown as surfaces 164 which may be shaped as gear teeth. A slot 160 is configured in sidewall 132b to receive a portion of the rotating member, namely the engageable surfaces. Top sidewall 132b is opposite to the hinge. The bottom sidewall 132c includes a single tablet dispensing aperture 170. The tablet dispensing aperture 170 is substantially rectangularly shaped and extends completely through the bottom sidewall 132c. In this embodiment, the tablet dispensing aperture 170 is also located with respect to the pointer 150 so that the pointer directly points to the aperture 170.

The tablet tray 108 and rotating member 110 make up a rotational tablet dispenser adapted for rotational advancement of medication and radial dispensing of medication from the cartridge. The tablet tray 108 includes a plurality of tablet stalls 180 that have at least a partially open top and a side. The tablet stalls 180 house tablets 182. The number of tablet stalls 180 corresponds in this embodiment to the number of teeth 158. The tablet tray 108 is a ring-shaped tablet tray having a removable tablet retention band 184 which temporarily closes the open sides of the stalls. The removable tablet retention band 184 may be operatively coupled to a base 186 of the tablet tray by perforation or other suitable removable attachment mechanism. During filling or refilling of the tablet stalls, the removable tablet retention band prevents tablets from exiting the open side of the stall. Each of the tablet stalls 180 has a back wall 190 to prevent the tablets from falling out of the stalls. The tablet tray 108 includes a substantially centrally located hole 192 extending therethrough. The hole 192 is sized to fit over hub 150. The front side of the stalls that are open and temporarily closed by the removable tablet retention band are located about the circumference of the tablet tray 108. Each open front side is spaced along a radius from a center point of the tray. The open side opening is arranged to individually align in registration with bottom wall aperture 170 when the tray is attached to a surface of the rotating member 110 and rotating member 110 is then placed in cooperation with the base 104.

The rotating member 110 includes a plurality of protrusions 196 that in this embodiment are spaced at approximately 120° apart may be integrally molded from plastic if desired. The protrusions 196 extend through corresponding openings 198 in the tablet tray 108 to affix the tablet tray to the rotating member. The rotating member 110, in addition to including the engageable surfaces 164 to engage with an actuating member for automated radial dispensing tablets, also includes a manual activation surface 200 to facilitate manual radial dispensing of medication from the cartridge. In this embodiment, the manual activation surface 200 is a knob or other surface, such as an upraised annular surface, which is sized to receive the tablet tray 108 through hole 192. The annular portion has a substantially flat upper face 202 which is upraised to lie at a height above the cover 106 when the cover is closed (see, for example, FIG. 4). Similarly, the hub 150 is also protruding to extend above an outer surface of the cover a when the cover 106 is closed. The upraised annular portion has a substantially U-shaped cross section, thereby forming a hollow portion between the upstanding legs which extend vertically downward to support flat surface 202. Immediately surrounding the hole 102 is an annular phalange 208 (FIG. 6) which serves as a short, circular lip to provide a mechanism of connection between the support 130 and the rotating member 110. Located on flat supper surface 202 is a plurality of indicators of periodicity 212. The indicators may be applied onto the member using stickers to allow for different schedules. As one example, the indicators may be abbreviations of the days of the week and each indicator day is referenced to a tablet in the tablet tray. Being affixed to the upper face of the annular portion of the rotating member, indicators 212 thereby rotate with the rotating member when rotation occurs. It will be understood that a variety of other information may be chosen, depending upon the tape of tablets to be dispensed, and the rate to be taken.

The rotational member 110 as configured in this embodiment is a gear having the plurality of actuation surfaces 164 configured to engage an actuation device to rotationally advance medication in the cartridge. The actuation surfaces in this embodiment are teeth. When assembled, the base 104, which includes the plurality of ratchet protrusions or teeth 158, are operatively engageable with the rotating member 110 to restrict rotational movement to facilitate single dose radial dispensing of tablets wherein the radial dispensing is out the bottom side wall through aperture 170.

The tablet trays 108 may be suitably made from a variety of materials including plastic and other conventional material used to package tablets. For example, suitable material that may be used to make the ring tablet trays may be the materials used by Ortho Pharmaceutical Corporation, Raretan, N.J. to make tablet trays disclosed in U.S. Pat. No. 4,165,709. This may be, for example, blister pack or blister sheet. The blister pack is made of a thin plastic or other easily formable material which has been formed into a plurality of tablet stalls. The tablet stalls are arranged in a circular orientation and substantially equally spaced apart to correspond with the teeth 158. Each stall is shaped and sized so as to enable commonly sized and shaped tablets or other solid form of pharmaceutical preparations to fit therein. It has been found that one suitable stall dimension may be height=9/16", width=0.375" and depth=7/8". The base 180 and removable tablet retention band 184 may be made of a frangible membrane such as a thin sheet of material such as foil or the like.

The tablet tray 108 is operatively removable from the cartridge housing so that refills or other tablet trays can suitably be installed. The filling of the tablet trays 108 may be done, for example, by a pharmacy, tablet manufacturer or other tablet source either by a manual or an automated system. The opentop of the stalls allows placement of the pills within the tablet tray 108. In one embodiment, each cartridge contains a single drug for a single patient. Once the tablet tray 108 is filled with the appropriate tablets, a stall top cover member 220 is placed over the top of the stalls to keep the tablets in their respective stalls during transportation. The stall top cover member 220 may be a flat ring shaped cap to correspond to the ring shape of the tablet tray and may be a nonadhesive cap or an adhesive-based cap, if desired. (For purposes of illustration, the stall top cover is not shown in FIG. 3). The stall top cover member may also be a flat sheet or any other suitable cover member adapted to cover the stalls.

As shown, the tablet stalls 180 are positioned along the periphery of the trays and are sized to hold a single tablet. The tablet tray. 108 with stall top cover member 220 is aligned into position with the rotating member 110 through the apertures 198. The cover 106 is then closed whereafter the removable tablet retention band 170 is removed to facilitate removal, the removable table retention band 170 includes an extension portion 222. The extension portion 222 is placed through the aperture 170 so that it may be readily gripped by fingers or other device. The removable tablet retention 170 band is removably fixed to a surface (e.g., base) of the tablet tray 108 such that it may be removed while the cover is closed. The removable retention band 170 should be sized and temporarily attached such that pulling the removable retention band 170 causes the rotating member to rotate and disconnection of the band 170 from the tray. Removing the tablet retention band 170 then exposes the open sides of the stalls. To avoid undesired tablet waste during band 170 removal, one stall may be kept empty. The permanent tablet retention ring. 116 in the cover surrounds the removable retention band 170, so that during and after removal the retention ring 116 serves to effectively close the open ends except for the stall which is placed in position with the aperture 170 to dispense a tablet. As such, the tablet tray 108 may be suitably transported and filled in a advantageous manner. The tablet tray 108 is a unitary structure in itself which provides easy handle ability for placement of the tray into the dispenser and subsequently easy removal upon exhaustion of the tablet supply.

On an under surface of rotating member 110, the surface facing flat support surface 130, there is a second set of ratchet teeth 230 FIG. 6b. In this instance there are only three ratchet teeth in the set and they are spaced substantially equal a part and circularly located on a radius which is substantially the same as the radius of location of the first set of ratchet teeth 158 on the support surface 130. Ratchet teeth 230 include an inclined edge thereon and project from the rotating member 110 to oppose the first set of ratchet teeth in the support. Thus, the two sets of ratchet teeth 230 and 158 are adapted to become intermittently, Engaged with each other to thereby allow incremental rotation of the tray and the support in only one rotative direction, not the other. This rotation is accomplished by the orientation of the incline surfaces in the vertical wall in each tooth directly opposite the incline surface. Such a mechanism is further disclosed, for example, in U.S. Pat. No. 4.165,709 incorporated herein by reference.

Referring to FIG. 5, the cover of the magazine is closed to enclose the tablet tray within the base. The manual activation surface is exposed above the top of the cover to allow manual activation of radial tablet dispensing out aperture 170. As shown, the aperture 170 is the only aperture through which medication may be dispensed.

Referring to FIGS. 7a and 7b, a matable stall insert 300 is shown having tablet stalls of a size smaller than the tablet stalls of the tablet tray 108. The matable stall insert 130 may contain, for example, smaller tablets. The matable stall insert 300 is operative to mate wraith the table stalls 180 so that the common size base tablet tray 108, can be fabricated along with differing sized stall inserts 300 to accommodate different size pills, such as smaller pills. As seen in FIG. 7b, also, the matable stall insert 300 includes a removable tablet retention band 302 projecting downward along a periphery of the insert to temporarily close open sides of the tablet stalls 304. As indicated, tablet stalls 304 have a base wall and rear wall and corresponding side walls but the top of the stall and the front side of the stall are open prior to the removable retention band being applied and prior to a stall top cover 306 being applied. The removable tablet retention band may be removably attached to a surface of the insert 300 through perforations.

Figure 8:
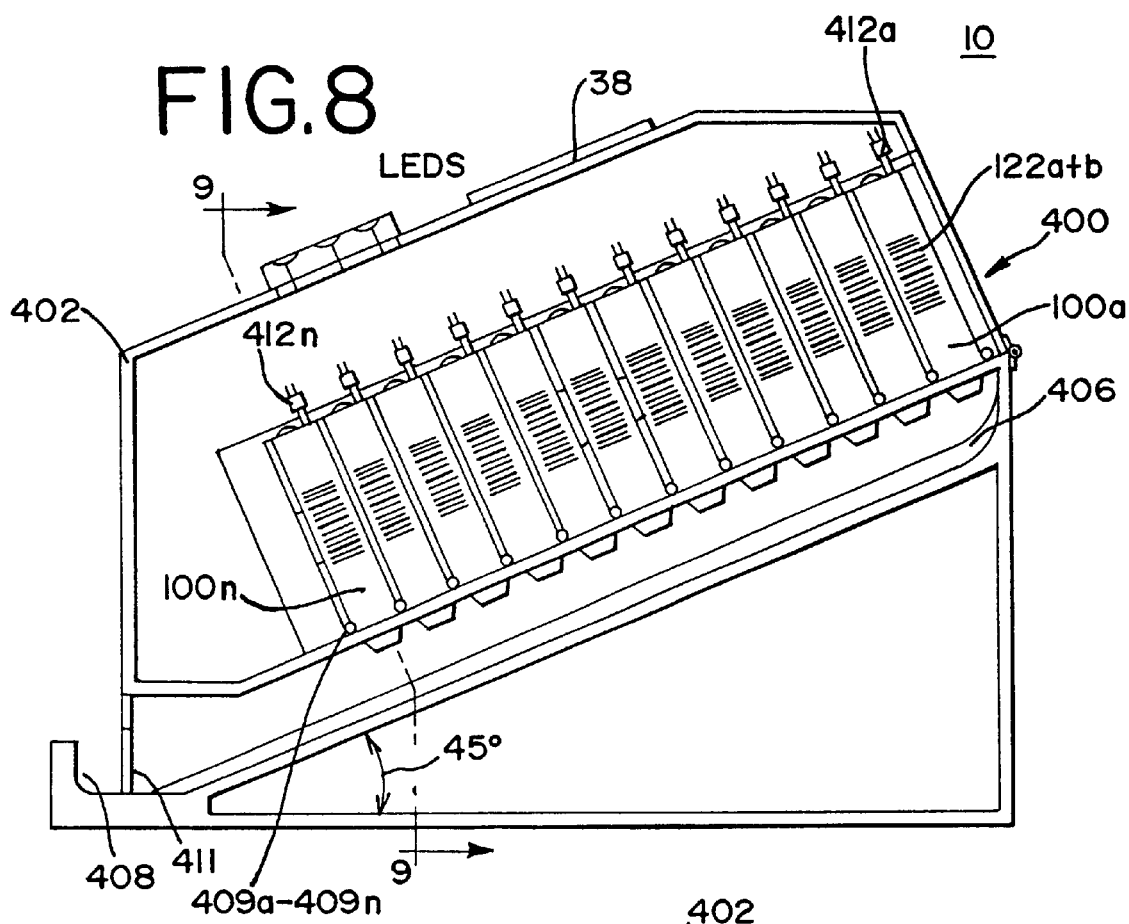
FIG. 8 is a perspective view of a medication dispensing apparatus in accordance with one embodiment of the invention having a sloped medication cartridge magazine and an angled tablet chute in accordance with one embodiment of the invention.

Referring to FIG. 8, a medication dispensing apparatus 10 is shown having a medication cartridge magazine 400 adapted to hold a plurality of radial dispensing medication cartridges 100a–100n. The device includes an enclosure 402 that houses the cartridge magazine 400 along with the requisite components of FIG. 2. As shown, the cartridge magazine 400) holds the plurality of the radial dispensing medication cartridges 100a–100n on edge and adjacent to one another to facilitate compactness and portability. The patient identification data 122 is machine readable medication identification data. Also, referring to FIG. 9, the plurality of radial dispensing medication cartridges 100a–100n radially dispense tablets downwardly through their respective apertures 170 into a common sloped tablet chute 406. Sloped tablet chute 406 has a cross-sectional "V" shape and directs radially dispensed tablets to a common receptacle 408 which contains all of the medication for a particular dosage. The sloped table chute may be sloped at an angle of approximately 45°. However, any suitable slope may also be used. FIG. 8 represents, for example, a cross-sectional side view of apparatus 10 through its housing 402. The sloped cartridge magazine 400 is suitably affixed to a frame within the housing and is adapted to hold the plurality of radial dispensing medication cartridges. The sloped cartridge magazine is sloped at about 45°. The sloped tablet receiving chute 406 is operatively located to receive tablets that are radially dispensed from the plurality of cartridges . Each of the plurality of cartridges 100a–100n as indicated includes an opening 170 therein through which an individual tablet is radially dispensed in response to actuation by an actuating mechanism 410. In this embodiment, the actuating mechanism 410 includes a separate actuator 412 associated with each of the plurality of radial dispensing medication cartridges 100a–100n. As such, the system 10 includes actuators 412a–412n. Each actuator 412 suitably engages the actuation surface of each of the rotational members to rotationally advance medication in the cartridge and regularly dispense the tablet vertically. The actuators 412a–412n may be, for example, electrically activated solenoids and associated activating members 413. Here the actuating members 413 are "L" shaped pivoting members suitably biased to operatively advance the rotational member to radially drop or expel one tablet at a time by being pushed forward by the solenoid and retracting after the rotating member has rotated. However, any suitable activating structure may be used, such as a direct action reciprocating solenoid, a series of linkages or other suitable mechanism. The common receptacle 408 may include a cover (not shown) which may provide a feedback signal to the data processor 30 to indicate whether medication has been removed from the common receptacle 408. If desired, the common receptacle 408 may also be configured as a plurality of separate receiving compartments wherein each compartment is dedicated to receive tablets from each of a separate cartridge 122.

Compliance detection is accomplished through the use of a plurality of sensors. In this embodiment, an array of electrodes or wires shown in cross-section as 409a–409m serve as one type of per cartridge based sensing device. The sensor uses a capacitance based array wherein capacitance is generated by the wires so that when a tablet drops from any of the cartridges, the change in capacitance between lines is detected by the processor 30. Depending upon which capacitance field is varied by the dropping of the tablet, the processor determines which cartridge radially dispensed the tablet. In addition to the per cartridge based sensor, a tray sensor 411, such as another capacitance based sensor, is placed in the receiving tray. Suitable wires are positioned to create another field and may be broken by fingers or other protruding elements that break or vary the capacitive field to obtain the tablets. As such, if the processor determines that a tablet has been dropped in accordance with a regimen, but that the sensor 411 has not detected that the tablet or tablets have been removed, the medical data bases may be reviewed to determine whether the next dosage needs to be modified and may also generate a display to the patient or a beep for the patient indicating that the medication has been dispensed.

Figure 9:
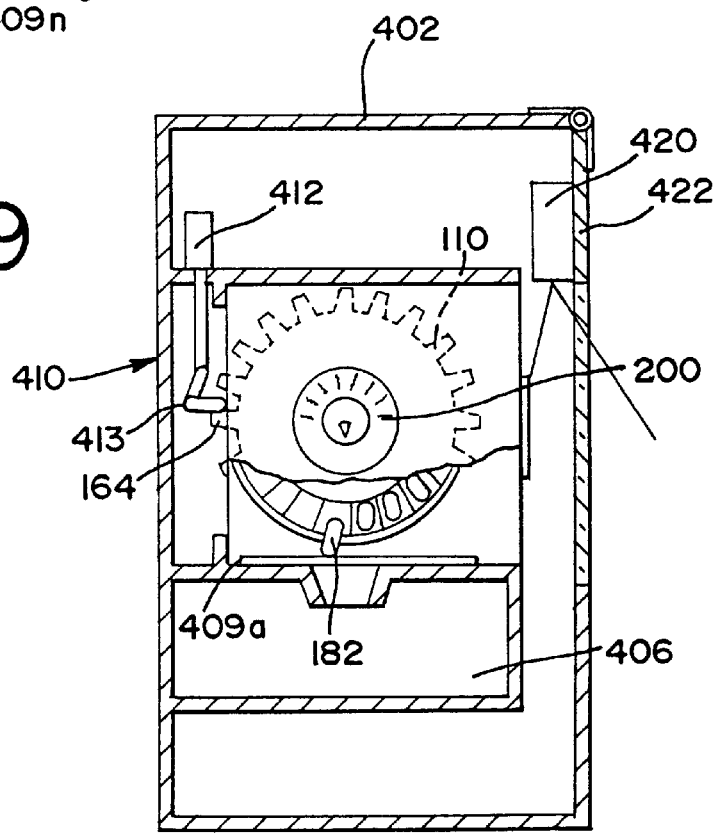
FIG. 9 is a cross-sectional view illustrating an actuator and associated rotating member of a radial dispensing medication cartridge in accordance with one embodiment of the invention.

Referring to FIGS. 2, 8 and 9, medication dispensing apparatus 10 uses a patient verification device, such as processor 30, operative to activate the radial dispensing medication cartridge in response to verification of patient identification data. The medication dispensing apparatus 10, as previously noted, includes the remote communication interface 34 as well as the data processor 30 that is operatively coupled to the radial tablet dispensing actuator 412, the patient verification device, such as the processor 30, and to the remote communication interface.

Each of the plurality of radial dispensing medication cartridges 100a–100n includes medication identification data 122, such as bar code data containing medication identification data and patient identification data. Medication identification data 122 may include, for example, the type of medication in a given cartridge along with its dosage requirements as well as patient identification data indicating the name and other patient identification information to ensure that the medication from the appropriate cartridges are being used for the proper patient. As such, the medication identification data 122 on different cartridges may be for different patients although housed in the same magazine.

The housing 402 includes a bar code reader 420 positioned to read the bar code data 122. The housing also includes a window 422. The bar code reader 420 is positioned to read the bar code data 122 on each cartridge and also to read the bar code data located outside the housing, such as bar code data on a patient's Wrist band, for example. The system then reads the bar code information on the patient's wrist band prior to dispensing medication. The system, through the data processor, compares the patient identification data from the patient's wrist band or verification card with the stored bar code information from the cartridges and confirms that the patient and cartridge are designated for each other and the processor suitably activates each appropriate solenoid the dispense the appropriate dosage of medication. As such, the processor receives patient identification data and also obtains patient identification data from the cartridge to serve as the patient verification means. The processor obtains, for example, patient identification data, medication identification data and dosage data from the plurality of radial dispensing medication cartridges when they are first inserted (and prior to each dispensing operation if desired) and subsequently controls the radial tablet dispensing actuator 412 to radially dispense single tablets from one or more cartridges in response to the obtained patient identification data, medication identification data and dosage data. The processor generates a control signal to the radial dispenser actuator (solenoid) either based on the comparison of information from the patient's wrist band and corresponding bar code as well as prestored dosage information that may have been communicated, for example, to the remote communication device, from a caregiver to indicate a change in dosage if the dosage information is not included on the bar code information and on the cartridge.

Referring to FIGS. 10–12, the apparatus will activate the bar code reader to read the cartridge bar code data 122a when a cartridge has been placed in a magazine as detected by the bar code reader or as indicated through a keypad by a patient. As shown in block 502, the system fetches the patient and drug information from the databases 18 based on the read cartridge bar code data. As shown in block 504, the system determines whether the prescription information from the bar code data matches the retrieved administration criteria data for the particular drug. If the prescription information does not match the administration criteria data, the system generates a patient or provider alert regarding the conflict as shown in block 506. For example, the system may display an error message to the patient or initiate communication with the remote provider to the modem. If the prescription information as read from the cartridge bar code matches the administration criteria for the given drug, the system alerts the patient to take medication as shown in block 508. This may be done, for example, by paging the patient, emitting a sound through the speaker, or through other suitable notification mechanisms.

As shown in block 510, the system reads the patient ID data from the patient ID bracelet (e.g., bar code on the bracelet) or other patient ID source unique to the patient. The system then compares the read patient to see whether the stored cartridge patient ID equals the read patient ID as obtained from the patient bar code as shown in block 512. If the patient ID on the cartridge does not match the patient ID obtained from the bar code data on the patient's bracelet, the system activates an alarm and inhibits dispensing as shown in block 514. As shown in block 516 if the stored cartridge bar code patient ID data matches the read patient ID data from the patient's bracelet, the system activates the appropriate radial dispenser based on the prescription data on the cartridge bar code as shown in block 516. As shown in block 518, the system determines whether proper dispensing has occurred by evaluating the data from the capacitive sensors. If the appropriate delivery sensors were activated indicating that a pill or pills were suitably dispensed, the system determines if the patient withdrawal sensor located in the tray has been activated as shown in block 520. If both the appropriate pill delivery sensors and the patient withdrawal sensor have been activated, the system resets regimen timers to begin dispensing again according to the patient's regimen as stored in the processor shown in block 522.

However, as shown in block 524, if the appropriate delivery sensor did not activate, the system may determine if the cartridge is empty by checking a counter that counts the number of times that a particular actuator for the cartridge had been activated since the last cartridge refill to determine whether medication is still present in the cartridge. If the cartridge is determined not to be empty, the system indicates that a malfunction has occurred and will generate an error notice on the display device for the patient and/or the provider. As shown in block 526, the processor may generate a patient message requesting that the patient remove the cartridge and actuate the cartridge manually to dispense a tablet. This manual dispensing may occur by turning the knob to force rotation of the rotating member.

Referring back to block 520, if the medication has been detected as being dispensed from the proper cartridge but the patient withdrawal sensor has not been activated, the system will inhibit further dispensing as shown in block 528. As shown in block 530, the system retrieves the stored interaction criteria from the suitable database to determine the next dosage requirement for the drug-specific regimen and alters the dispensing based on the interaction criteria to facilitate automatic dosage modification.

As shown in FIG. 11, the tablet trays and associated cartridges may be filled and processed as follows. As shown in block 600, a machine or other operator may fill the tablet stalls as shown in block 600 with the desired medication and then apply the stall top seal. As shown in block 602, a bar code generator generates the cartridge bar code data 122a, patient-specific bar code data 122b, and patient ID bar code data. As shown in block 604, a pharmacist or machine may apply the cartridge bar code data and patient specific bar code data to the cartridge. As shown in block 606, the patient identification bar code data is applied to the patient bracelet or other medium to insure that verification between the patient and the corresponding medication can be performed by the processor.

FIG. 12a–12b represents one example of the cartridge bar code data 122a and the cartridge patient/prescription-specific data 122b. As shown, the cartridge bar code data may be a bar code including, for example, generic drug identification data, drug class information, lot number information, manufacture identification information the size and color of the tablets in the trays, and any other suitable information. Similarly, the cartridge patient/prescription specific data maybe placed in the bar code and may contain patient ID data, such as the name, social security number or other identifying information of the patient, or prescription identification data indicating for example, a prescription number instead of patient identification information. In addition, the cartridge patient/prescription specific data may include medication provider information such as the name of the tablet provider, such as a pharmacy or manufacturer, the prescription (e.g., the physician instructions as to dosage, frequency etc. . . . ), any suitable pharmacy provider internal control data, and any other suitable data.

FIG. 12c illustrates an example of patient verification data that may be located in barcode form or any suitable form on a patient ID card, bracelet or other suitable mechanism. The data includes patient identification data such as a name, unique number or other suitable identification data. If the system is used to dispense medication for multiple patients, the identification data may be unique to at least one of the cartridges. Also if desired, the patient data may include expiration data, that is used by the processor to stop dispensing when the expiration date is reached. This expiration data may also be compared to the expiration data included on the cartridge barcodes.

The present invention is also directed to a medication dispensing device in which a tablet carrier tape is utilized instead of the tablet tray 108. Carrier tapes are known for use in packaging electronic components. Numerous companies, such as ADVANTEK CORP., provide such carrier tapes for electronic components. Also, it is known to use blister packs (such as provided by Nektron, Incorporated) for pills and tablets. Furthermore, numerous companies manufacture and sell machinery for filling carrier tape. V-tek, Incorporated and Argosy, Incorporated are two companies that provide such machinery. In U.S. Patent No. 5,630,347 issued to Elvio, for a pharmaceutical dispenser for dispensing a variable and predetermined of tablets for similar products packaged in a blister strip, machinery is disclosed which dispenses a predetermined number of pills in a crimped blister pack strip from a supply reel. This machine, after counting the number of requested tablets, cuts off the blister strip and drops it into a delivery tray.

Figure 13:
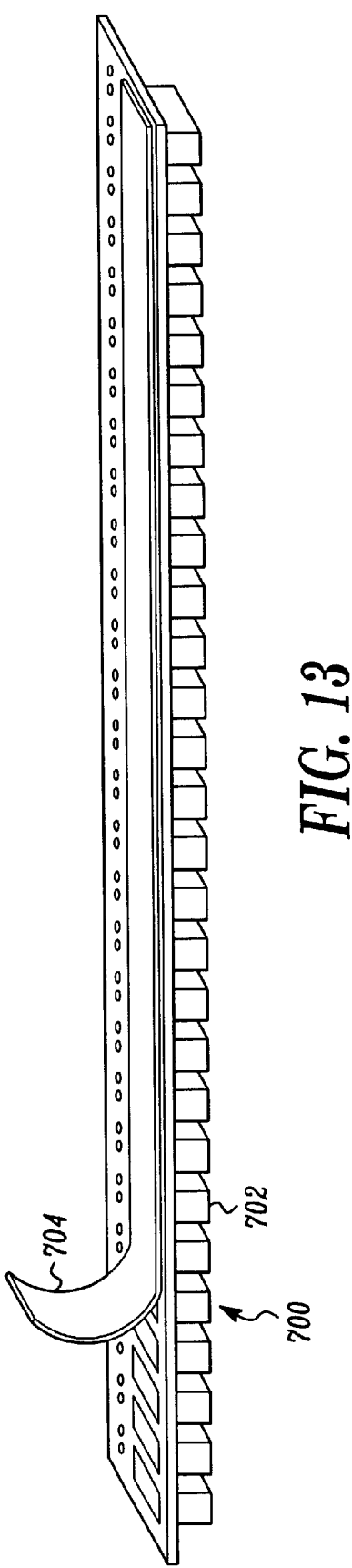
FIG. 13 is a perspective view of a carrier tape used according to the present invention.
Figure 14:
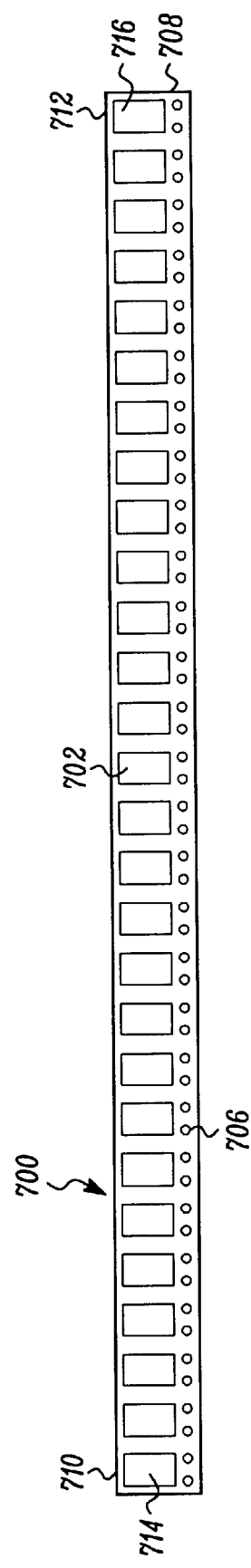
FIG. 14 is a top view of the FIG. 13 carrier tape.

The present invention provides a novel embodiment for a medical dispenser which utilizes the carrier tape technology. As depicted in FIG. 13, the carrier tape 700 has a plurality of pockets 702 and is sealed by cover tape 704. Also as can be more clearly seen in FIG. 14, in the carrier tape 700 is a series of apertures 706 along an edge 708 of the carrier tape 700. As will be explained below, these apertures 706 function as registration apertures for indexing the carrier tape 700 in the medication dispensing device.

Figure 15:
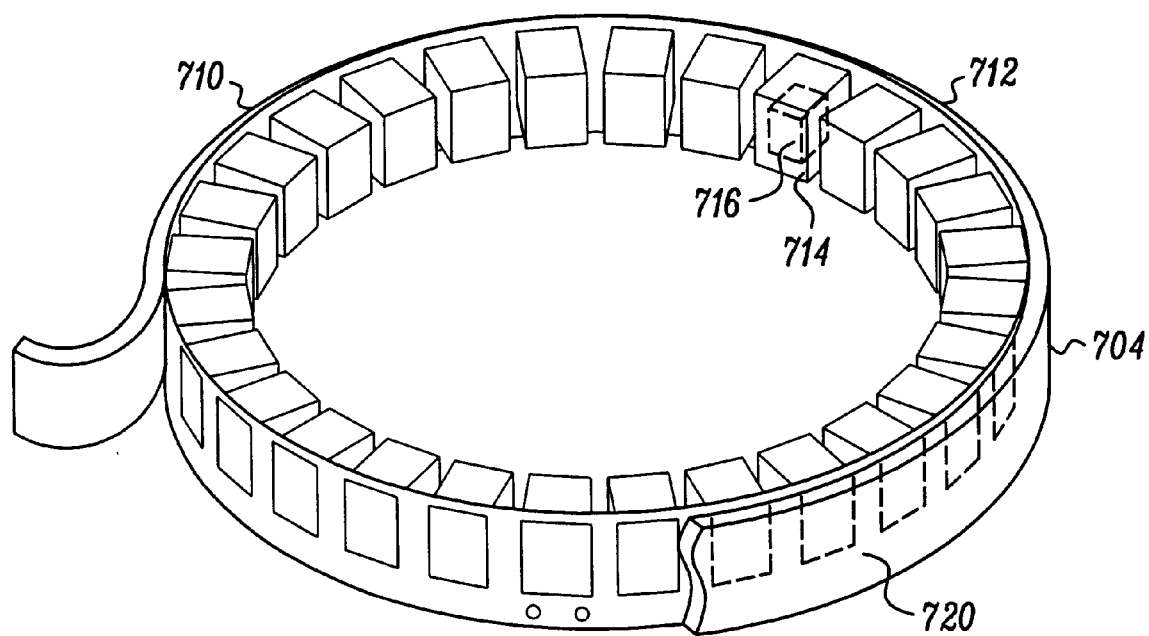
FIG. 15 is a perspective view of the carrier tape which has been formed into a loop.

Initially, the carrier tape 700 is filled with pills or tablets of medication (hereinafter the term "tablet" will refer to all forms of medication, such as pills or tablets, and the pockets 702 of the carrier tape 700 have been sealed with the cover tape 704 by means of a cold seal adhesive, a heat activated adhesive or a pressure sensitive adhesive, for example). A predetermined length of the carrier tapes 700 is then cut from a larger supply of the carrier tape 700 and is formed into a loop attaching a first end 710 of the carrier tape 700 to a second end 712 of the carrier tape 700 the first end 710 is connected to the second end 712 by engaging a first pocket 714 on the first end 710 with a last pocket 716 on the second end 712. This is depicted in FIG. 15. Also in FIG. 16 a cross sectional view shows that the last pocket 716 engaged with the first pocket 714. It is to be noted that obviously the first pocket 714 must be empty such that the last pocket 716 with its respective tablet 718 can be inserted thereinto. Also as can be seen in FIG. 15, an identifier 720, such as a barcode, has been affixed or printed on the cover tape 704 which in turn is affixed to the carrier tape 700. This identifier or barcode 720 then functions to identify the medication which is contained in this carrier tape 700.

Figure 16:
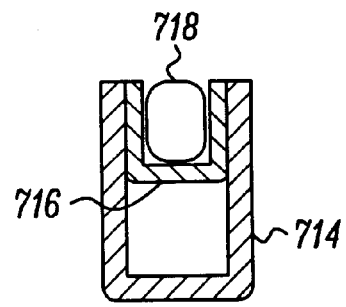
FIG. 16 is a cross sectional view of a detail of the carrier tape depicted in FIG. 15 with space limiting insert.

As depicted in FIGS. 15 and 16, the first and second ends 710, 712, of the carrier tape 700 are releasibly attached to one another by means of the "snap-like" fit of the last pocket 716 into the first pocket 714. Other methods of attaching the first and second ends 710, 712 are envisioned such as the use of heat activated adhesive or pressure sensitive adhesive. By using adhesives, it would not necessarily be required that the last pocket 712 to engage in the first pocket 714.

Figure 17:
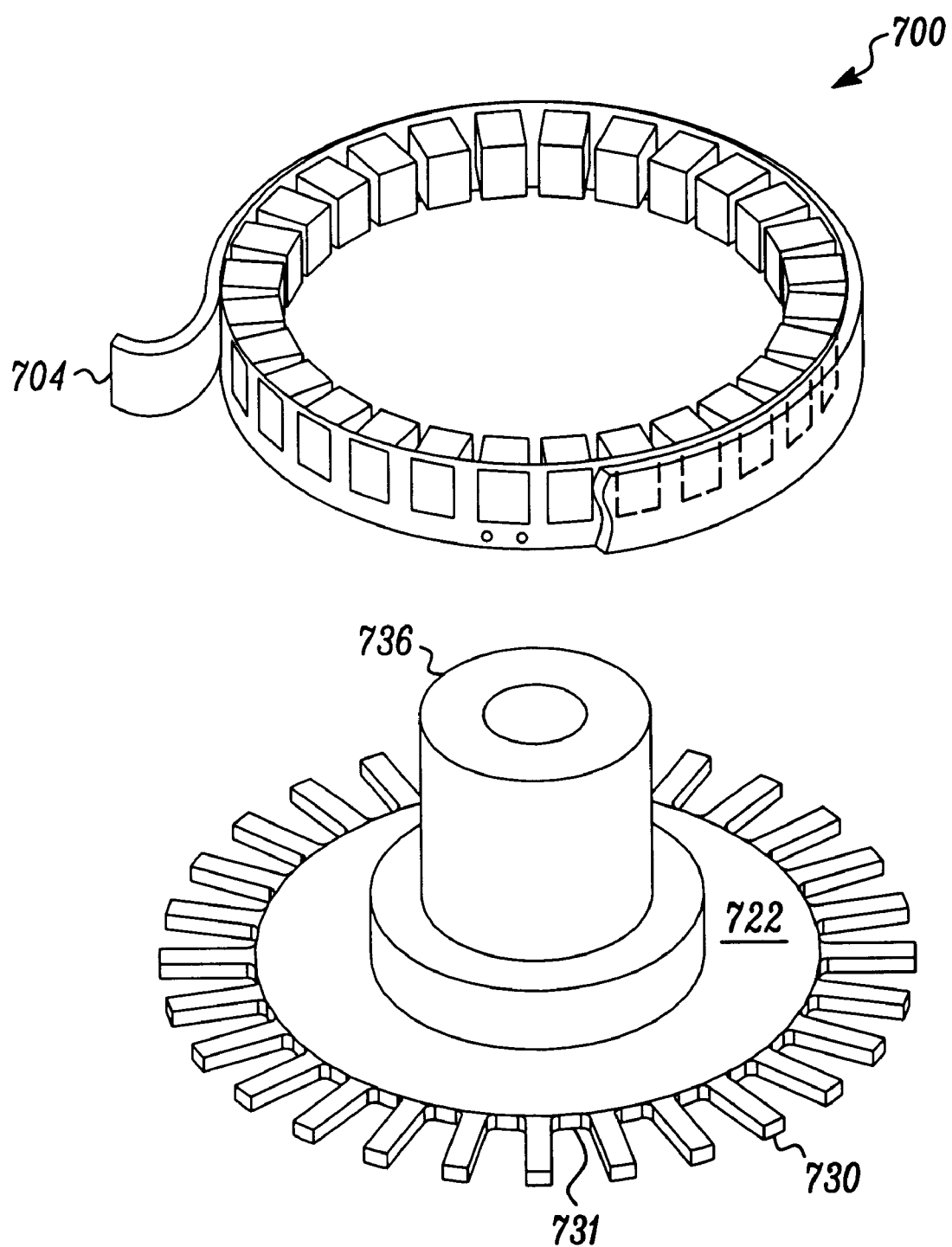
FIG. 17 is a perspective view of the carrier tape loop showing installation on a rotational member.
Figure 18:
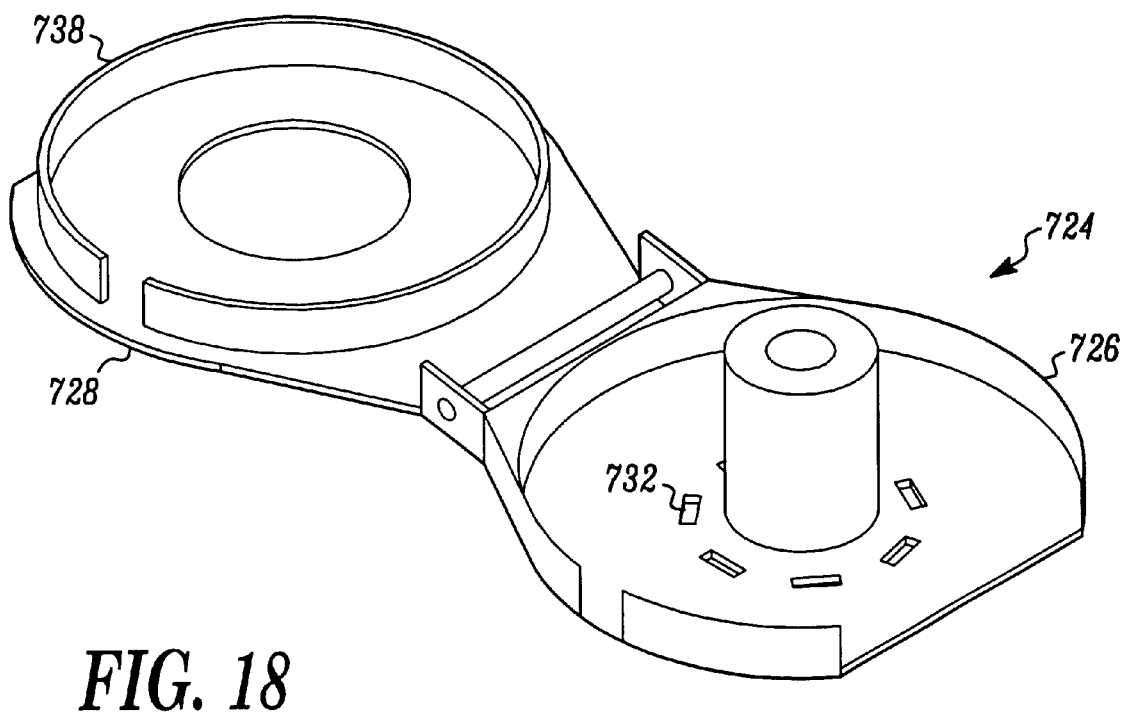
FIG. 18 depicts a housing for the carrier tape and rotational member.
Figure 19:
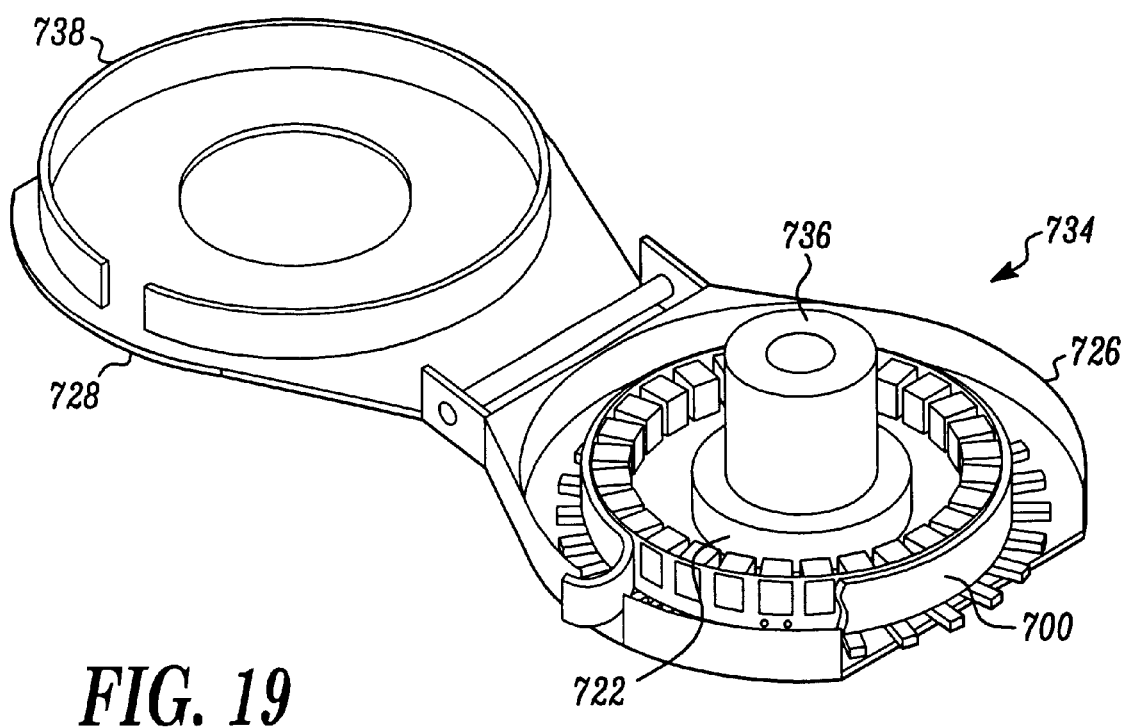
FIG. 19 is a perspective view showing the rotational member and carrier tape installed in the FIG. 18 housing.

As depicted in FIGS. 17, 18 and 19, the carrier tape 700 is placed on a rotational member 722 which is then inserted into a housing 724. The housing 724 has a base 726 and cover 728 which is hinged to the base 726. The rotational member 722 has teeth 730 and engages the ratchet protrusions 732 on the base of 726 of the housing 724 when the rotational member 722 is placed in the housing 724.

The cover 728 is moved to a closed position with the base 726 and forms the radial dispensing medication cartridge 734 which operates as previously described herein. That is, in general, the cover tape 704 is removed from the carrier tape 700 after the carrier tape 700 has been placed on the rotational member 722 and inserted over the hub 736 and the cover 728 closed. The cover 728 has a wall 738 which retains the tablets in the pockets 702 of the carrier tape 700 after the cover tape 704 has been removed.

Figure 20:
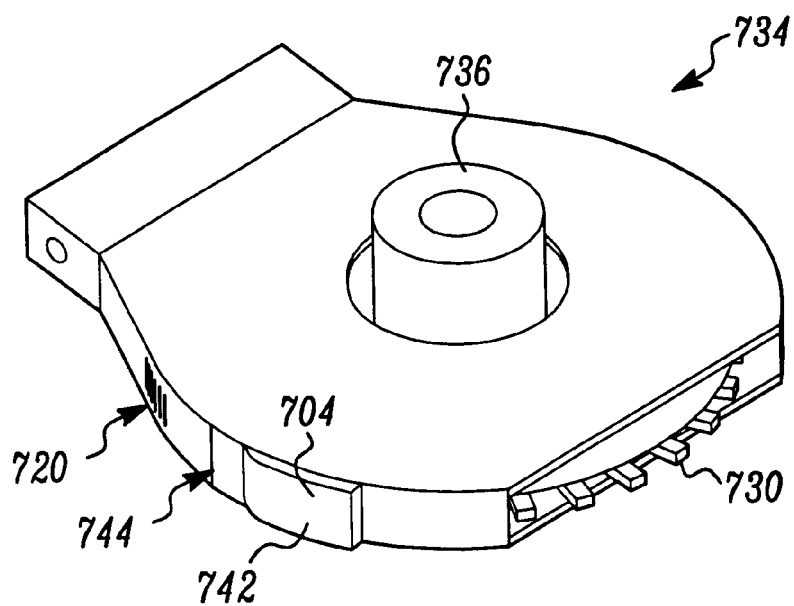
FIG. 20 is a perspective view of the closed housing according to the present invention.

FIG. 20 depicts a cartridge 734, the cover 728 having been placed in the closed position against the base 726. Referring now also to FIG. 19, the cover tape 704 is pulled out of the opening 744 in the cartridge 734. As the cover tape 704 is pulled, it is removed from the carrier tape 700, and thereafter is wound around the outside of cartridge 734 as shown in FIG. 20. Various adhesives and various locations on the outer edge of the cartridge 734 and the cover tape 704 can be utilized for affixing the cover tape 704 to the cartridge 734. After the cartridge tape 704 is affixed to the cartridge 734 shown in FIG. 20, the tablets are contained in the pockets 702 of the carrier tape 700 by the wall 734 of the cartridge 734. The cover tape 704 therefore also functions to seal the opening 744 in the cartridge 734 during shipment of the cartridge 734. The identification 720, or bar code, also appears now on the cover tape 704 and therefore the medication contained within the cartridge 734 is readily identifiable.

Figure 21:
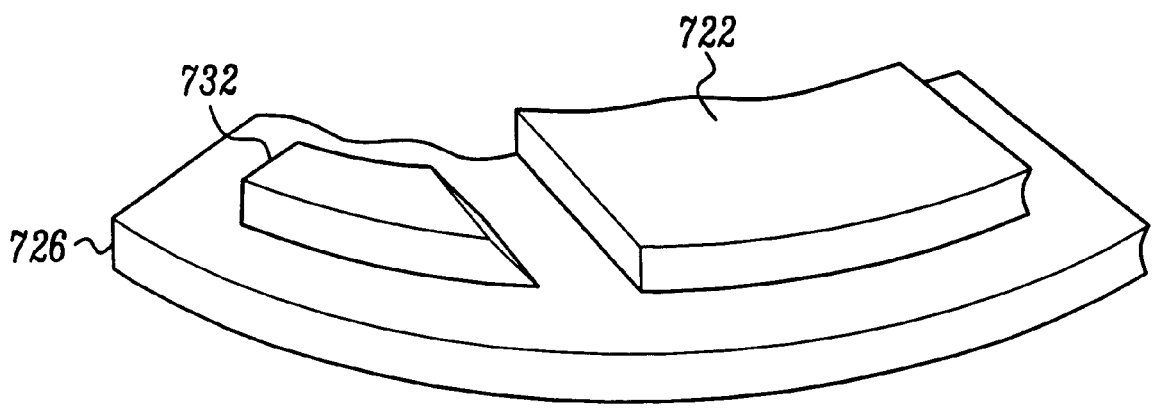
FIG. 21 is a cutaway prospective view of a detail of the base of the housing and the rotational member according to the present invention.

FIG. 21 shows a detail of the location of one of the ratchet protrusions 732 on the base 726. The ratchet protrusion 732 engages the rotational member 722 as previously described.

Figure 22A:
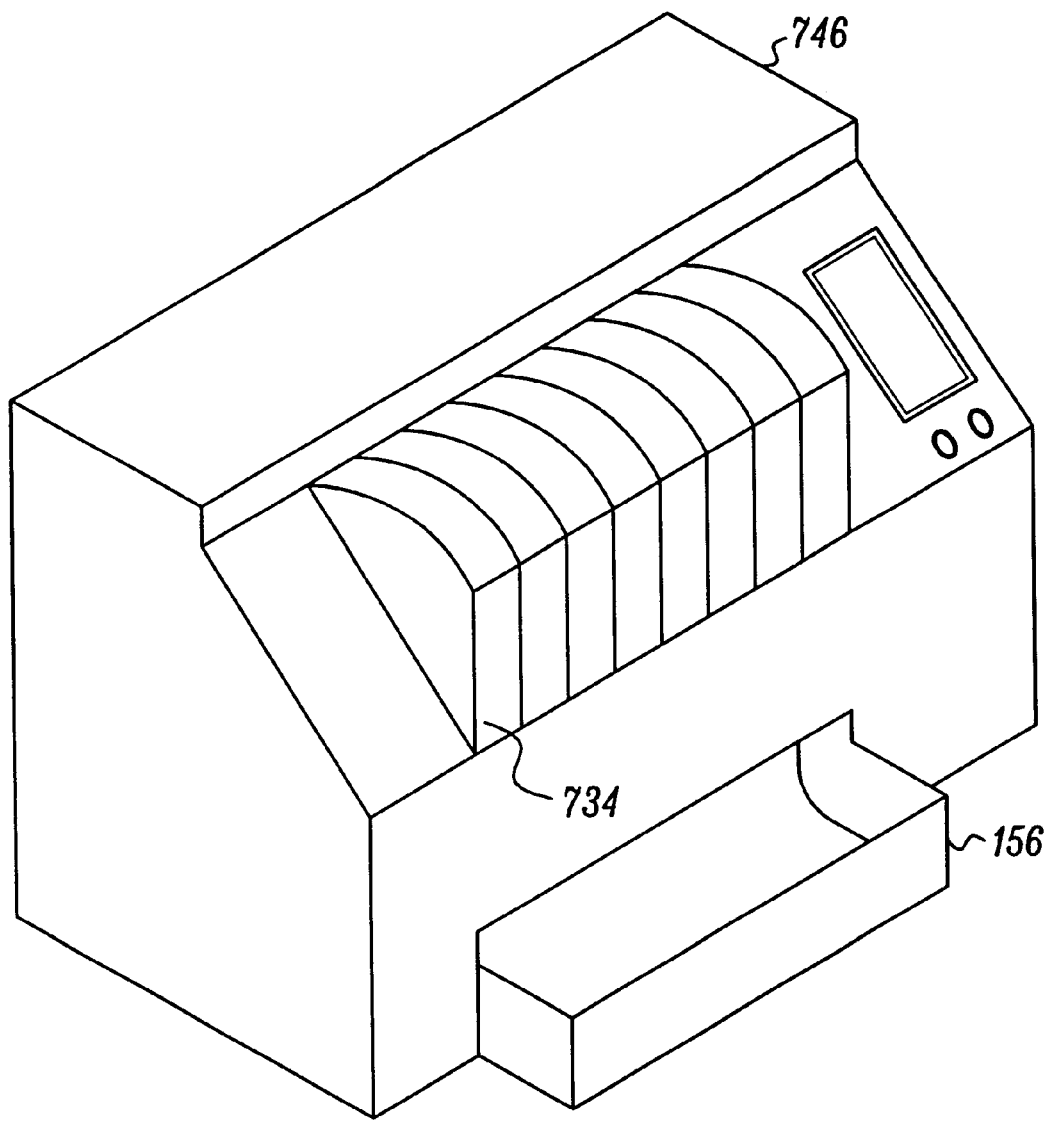
FIG. 22a is a prospective view of a medical dispensing device with installed cartridges according to the present invention.
Figure 22B:
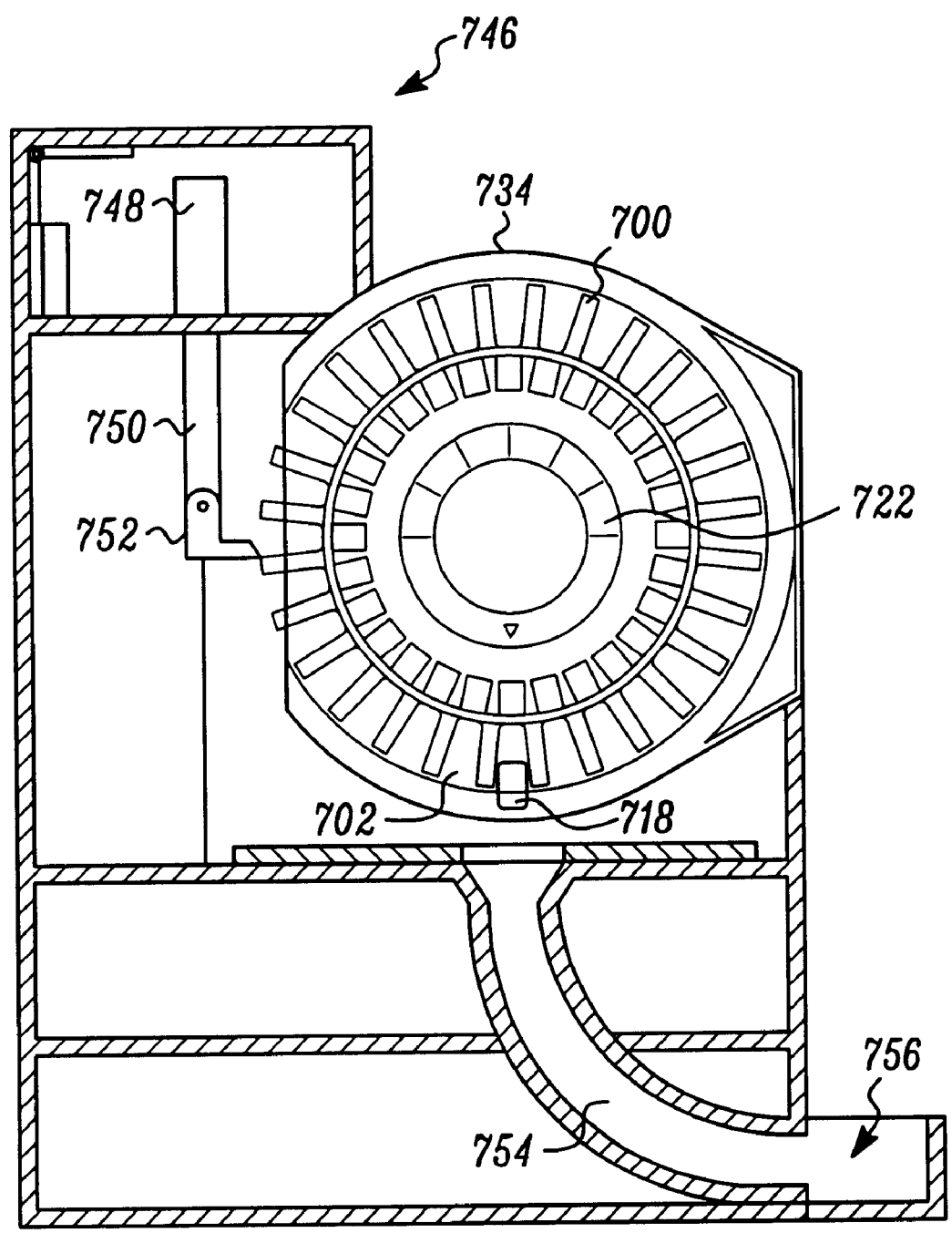
FIG. 22b is a cross sectional view of the FIG. 22a medical dispensing device.

A plurality of radially dispensing medication cartridges 734 are installed in a medical dispensing device 746 as depicted in FIG. 22a. FIG. 22b is a cross sectional view of the medical dispensing device 746 which shows one of the cartridges 734 which contains the carrier tape 700. An operating system, such as a solenoid 748, is linked by shaft 750 to a ratchet mechanism 752 that engages the teeth 730 on the rotational member 722. In response to receive electrical signals, the solenoid 748 activates the mechanism 752 to rotate the rotational member 722, thereby releasing a predetermined number of tablets 718 from respective pockets 702. These tablets 718 fall down a shoot 754 to an open area 756 where they can be retrieved by a patient or other personnel.

Figure 23:
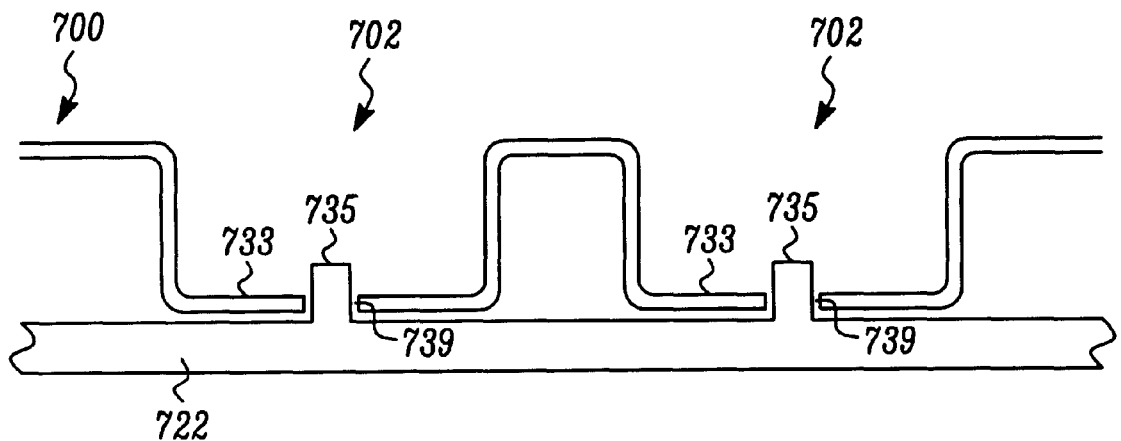
FIG. 23 is a cross sectional view depicting the engagement of the rotational member with the carrier tape for proper registration.
Figure 24:
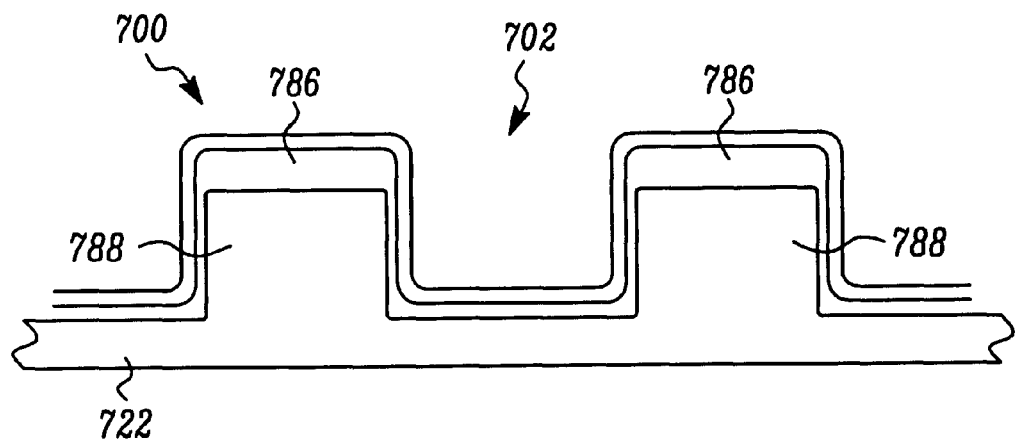
FIG. 24 depicts another embodiment of the engagement of the rotational member with the carrier tape for proper registration.

For proper operation of the medical dispensing device 746, the carrier tape 700 must be in proper registration with the rotational member 722. This is effected by pins 731 on the rotational member 722 as depicted in FIG. 17. In this embodiments four sets of 2 pins 731 each are placed 90 degrees apart around the circumference of the rotational member 722. (See FIG. 17) Pins 731 engage the apertures 706 in the carrier tape 700. Alternatively, apertures 739 are formed in the bottom sides 733 of the pockets 702 in the carrier tape 700. These apertures 739 would then engage pins 735 of the rotational member 722. This is depicted in FIG. 23. A further alternative is to utilize the spaces 786 between the pockets 702 for engagement with pins 738 on the rotational member 722. (See FIG. 24).

Figure 25:
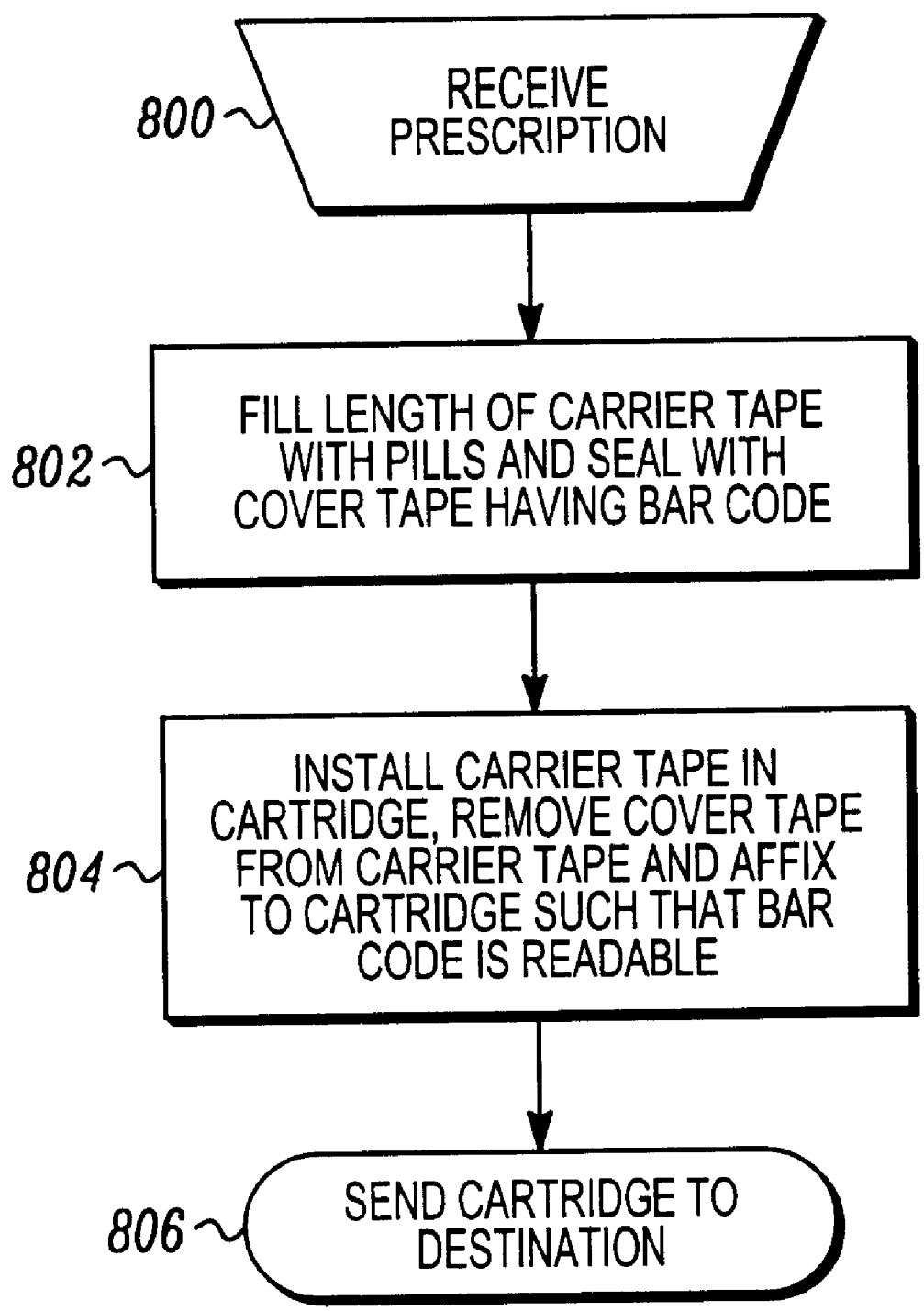
FIG. 25 is a general flow chart depicting the overall process of receiving a prescription and ultimately sending it to the patient according to the present invention.

FIG. 25 illustrates in a flow chart the operation of the medication dispensing device 746. FIG. 11 is a flow chart depicting the operation of filling the carrier tape 700 and inserting the carrier tape 700 into the medical dispensing device 746 for dispensing medication to a patient.

In the most general terms of the present invention, FIG. 25 depicts a flow chart of the inventive process wherein initially (step 800) a prescription for medication is received, for example, by a pharmacist. In the next step 802 a prescription is filled by taking a predetermined length of carrier tape, inserting medication tablets into pockets of the carrier tape and sealing the carrier tape with a cover tape. In an embodiment as described above, a packet at one end of the carrier tape is not filled. A barcode is attached to the filled carrier tape to identify the medication contained therein. In a third step 804 the filled carrier tape is then installed in the cartridge and the cover tape 704 is removed from the carrier tape 700 and affixed to the outer perimeter of the cartridge 734. It is to be understood that the barcodes can contain additional information, or a plurality of different barcodes or identifiers can be applied to either or both of the carrier tapes and cartridges.

Figure 26:
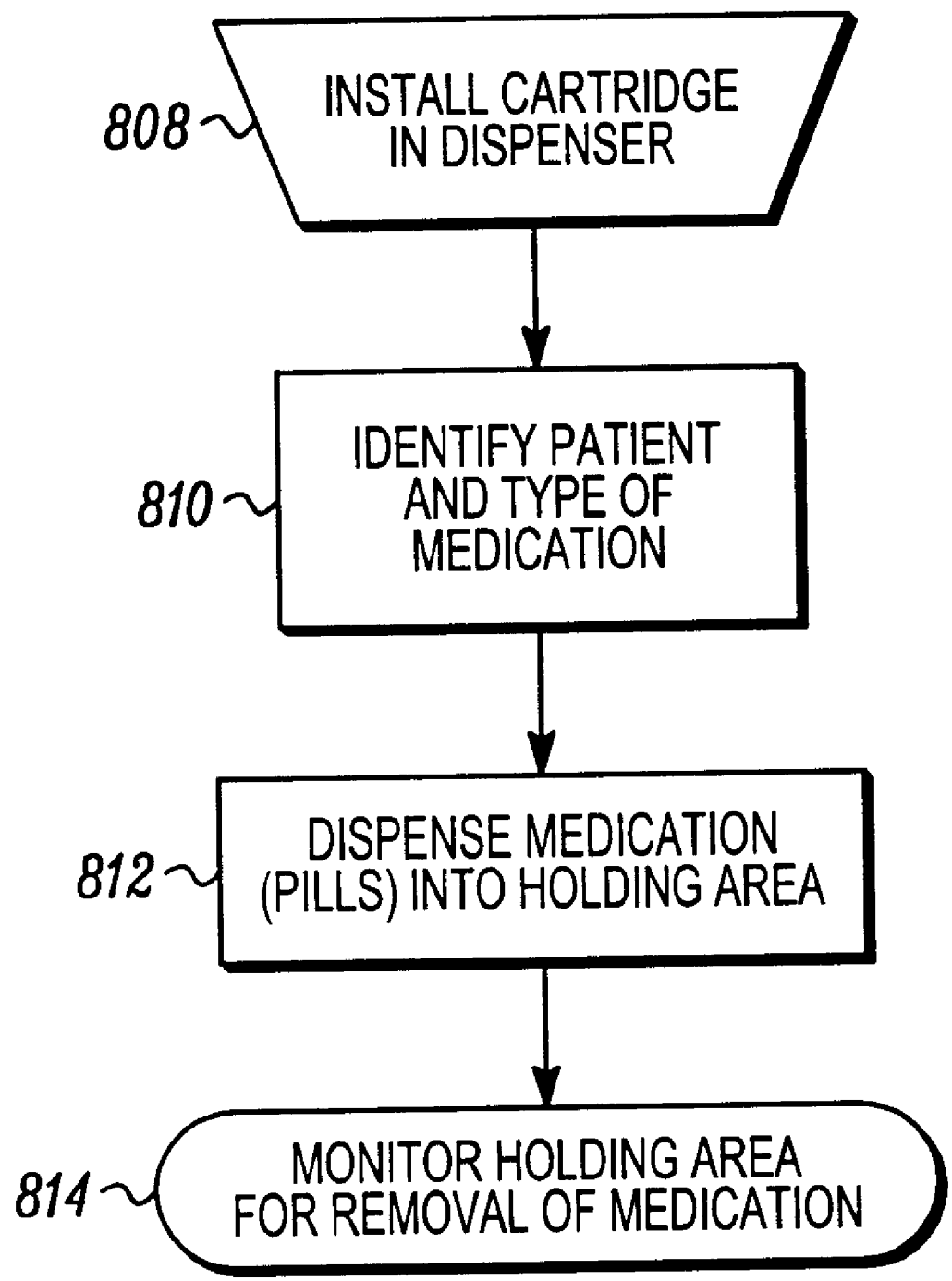
FIG. 26 is a general flow chart which depicts dispensing medication in the medical dispensing deice according to the present invention.

In step 806 the filled cartridge is then forwarded to the patient, pharmacy, or other destination. As depicted in FIG. 26, the cartridge is installed in the dispenser in step 808. In step 810 the patient is identified and the medication is identified for dispensing to the patient. In step 812, the medication is dispensed into a holding area and in step 814 the medical dispensing device monitors the holding area to determine if the pills have been retrieved by the patient.

FIGS. 10 and 11 show the details of the method depicted in general in FIGS. 25 and 26.

Figure 27:
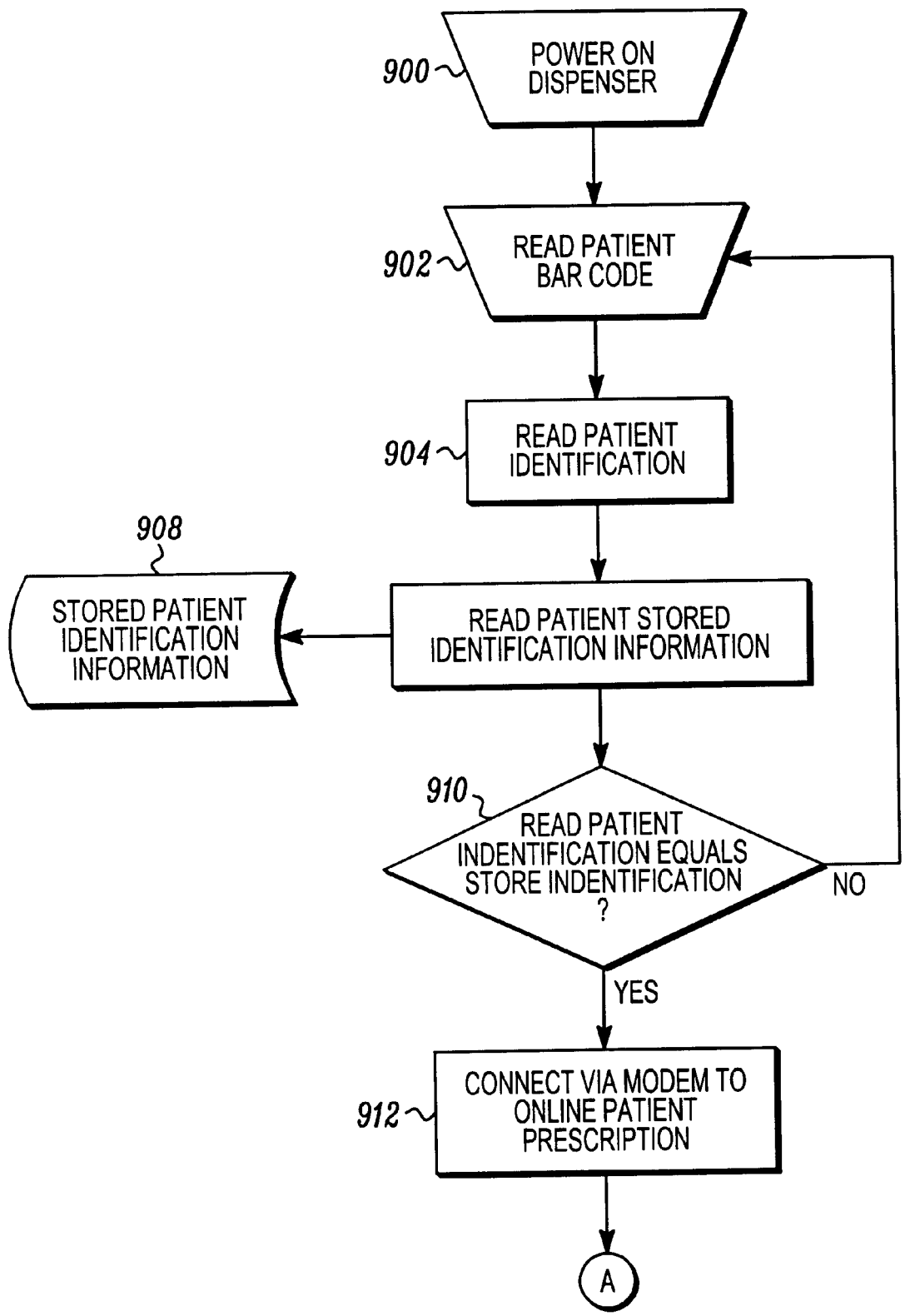
FIG. 27 is a logic diagram depicting operation of a medication dispensing device.
Figure 27:
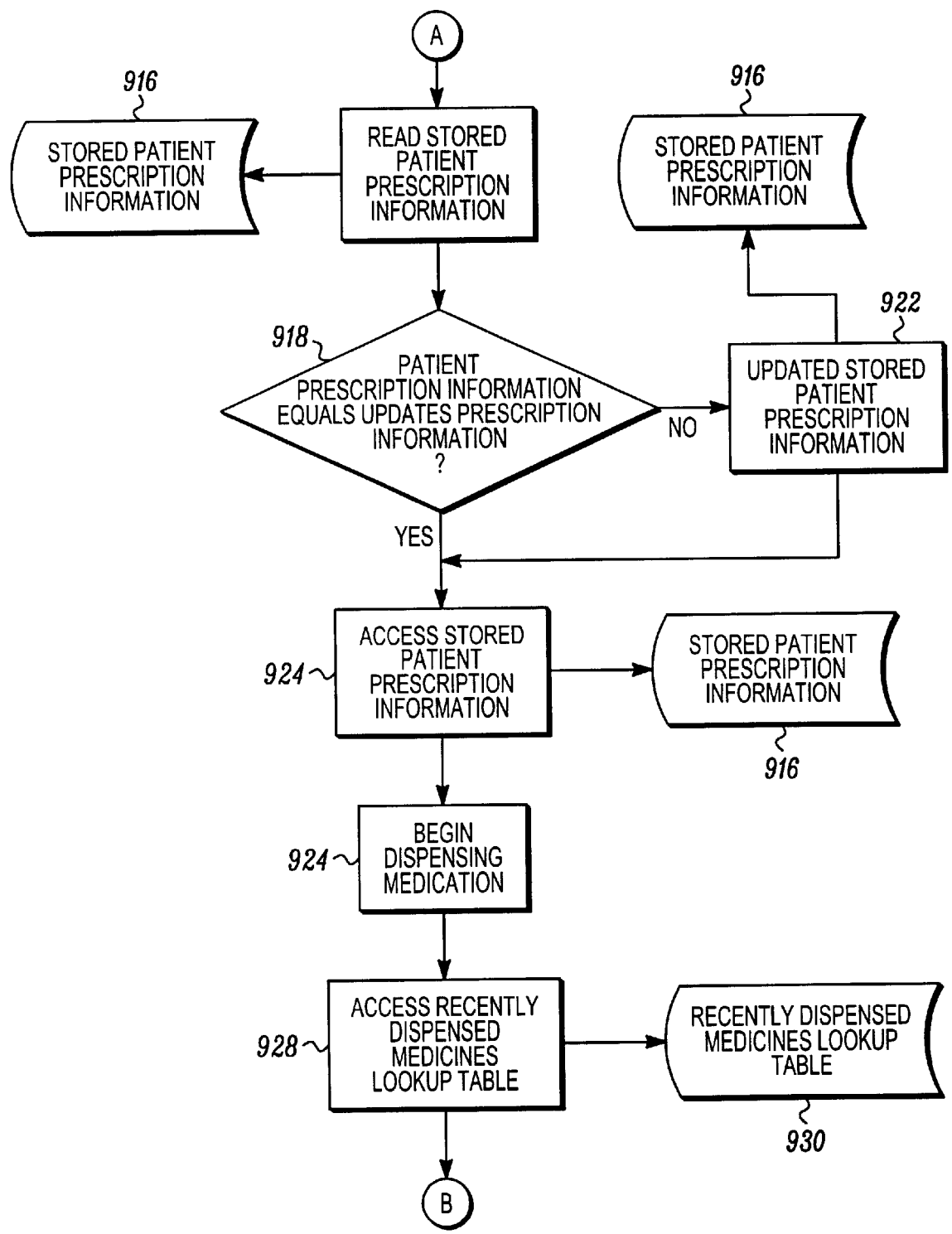
Figure 27:
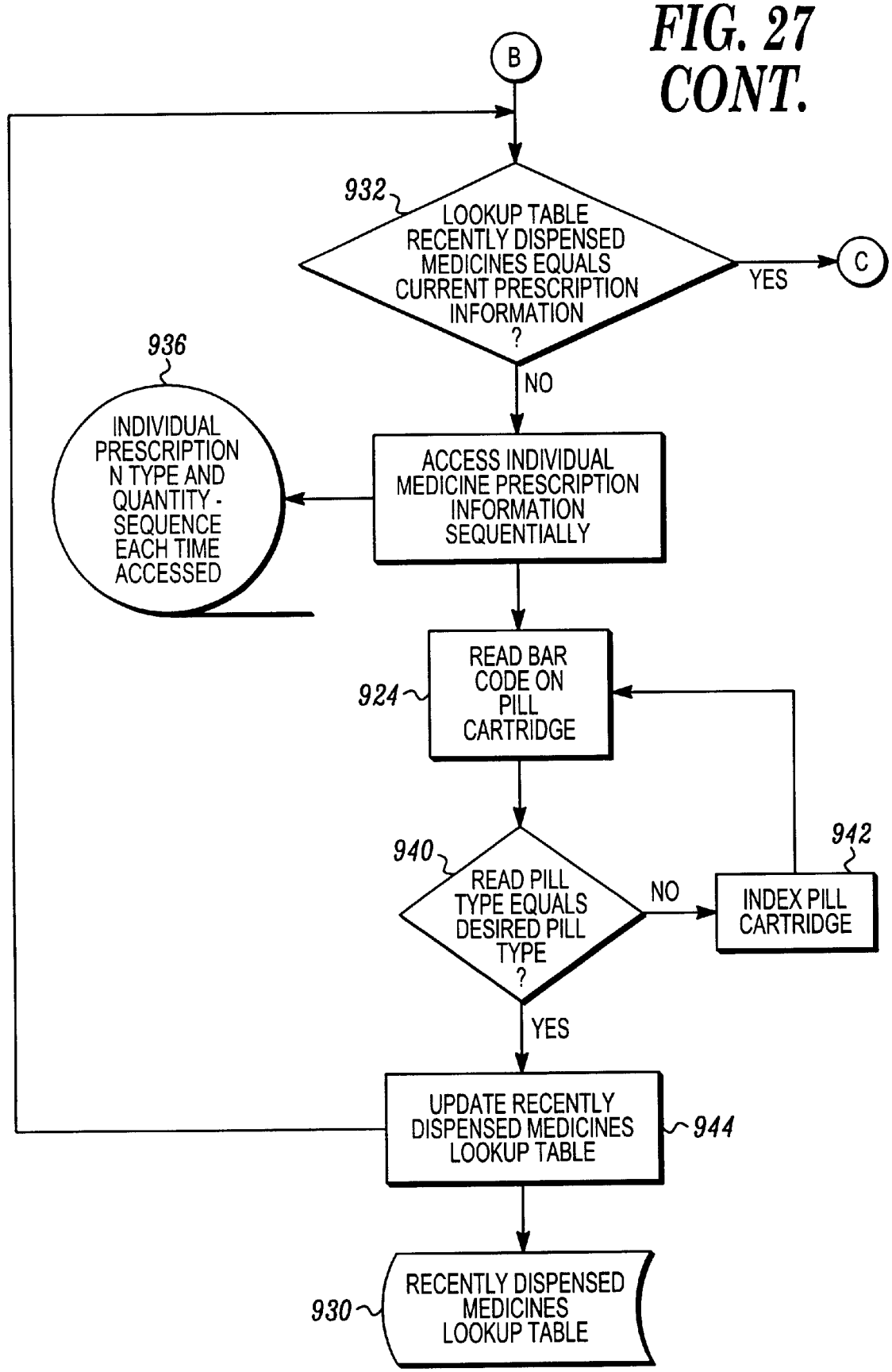
Figure 27:
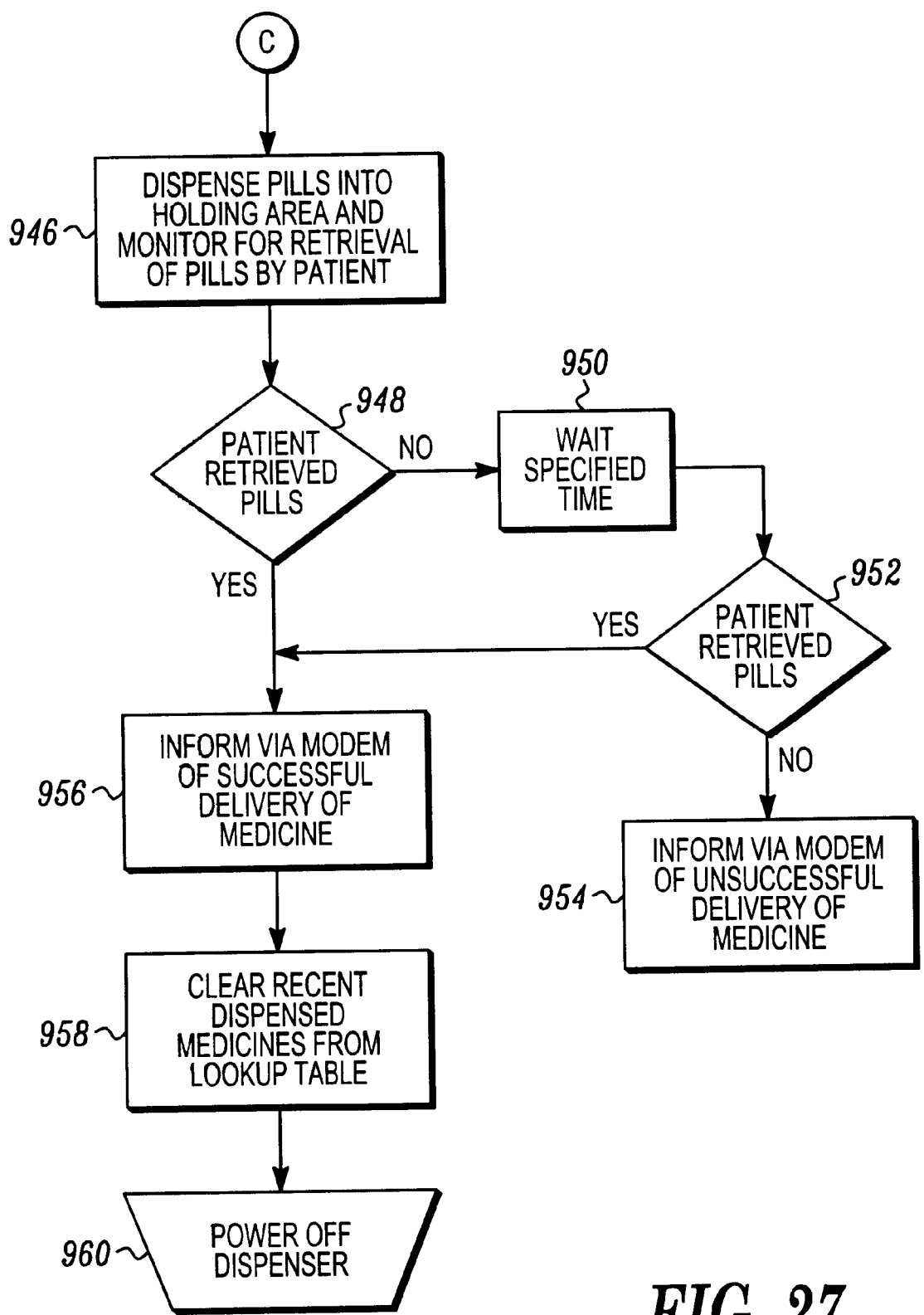

FIG. 27 is a logic diagram depicting operation of the present invention for dispensing medication. In a first step 900 a pill dispensing apparatus is initialized. In the second step 902 a patient is identified by the patient's bar code identification, which is read by a bar code reader on the medication dispensing device.

In step 904, the patient identification is read by a bar code reader and in step 906 patient identification information which is stored in a storage device 908 is read. Step 910 compares the patient bar code identification with the stored patient identification information. If no match occurs, then the patient identification bar code is read again in step 904. If a correspondence is found in step 910, then the procedure for updating the patient's prescription is initialized in step 912.

The stored patient prescription information is read in step 914 from the stored patient prescription information in storage device 916. In step 918 a comparison is made to determine if the patient's prescription information matches the updated prescription information. If this is not the case, then the updated patient prescription information is stored in storage 916 in step 922. Thereafter, the patient prescription information is accessed in step 924 from the stored patient information storage 916.

The process for dispensing medication is initialized in step 926. A recently dispensed medicine lookup table is accessed in step 928 from the table stored in 930. Step 932 compares the recently dispensed medication that is received from the recently dispensing medication lookup table to the present prescription information. If no match occurs, then individual medication prescription information is sequentially accessed by step 934 in the data base 936. A pill bar code on a cartridge of pills is then read in step 938 after which a comparison is made between the read pill type and the desired pill type (see step 940). If no match occurs, then the pill cartridge is indexed to place the next pill cartridge in position for reading by step 938 (see step 942). When a match occurs, then the look up table is updated in step 944.

When a comparison is made in step 132 of the recently dispensed medication in the look up table to the current prescription information, then the medication dispensing device dispenses the pills into a holding area. (See step 946). In step 948 it is determined if the patient has retrieved the pills from the holding area. If the patient has not retrieved the pills, then a predetermined period of time is specified for waiting in step 950. After the time period has expired then another check is made to determine if the patient has retrieved the pills from the holding area in step 952. If the pills have still not been received, then information is provided of an unsuccessful delivery of pills of medication (see step 954). When a patient has retrieved the pills, then this information is recorded in step 956 and the recently dispensed medication look up table is cleared in step 958. In step 960 the medication dispensing device is placed into a power down mode.

It should be understood that the implementation of other variations and modifications of the invention in its various aspects will be apparent to those of ordinary skill in the art, and that the invention is not limited by the specific embodiments described. For example, many different variations may be made to the carrier tape. It is therefore contemplated to cover by the present invention, any and all modifications, variations, or equivalents that fall within the spirit and scope of the basic underlying principles disclosed and claimed herein.

What is claimed is:

1. A medication dispensing device, comprising:
    a tablet carrier tape having a plurality of tablet pockets, each of the pockets having one opening; and
    the tablet carrier tape having first and second ends that are attached to one another.

2. The medication dispensing device of claim 1, wherein a tablet cover tape is removably attached to the tablet carrier tape and positioned to cover the openings of the pockets.

3. The medication dispensing device of claim 2, wherein at least one of each of the tablet pockets, except for at least one of first and last pockets, contains a respective tablet that is retained therein by the tablet cover tape.

4. The medication dispensing device of claim 1, wherein the first and second ends have predetermined structures that are engageable with one another such that the first and second ends of the tablet carrier tape are releasably attachable to one another.

5. The medication dispensing device of claim 1, wherein a first pocket on the first end of the carrier tape is engageable with a last pocket on the second end of the carrier tape.

6. The medication dispensing device of claim 1, wherein the tablet carrier tape has a registration structure.

7. The medication dispensing device of claim 6, wherein the registration structure is a series of registration apertures in at least one edge of the tablet carrier tape.

8. The medication dispensing device of claim 6, wherein the pockets on the tablet carrier tape are spaced apart by substantially equal separation areas, and wherein the separation areas form the registration structure.

9. The medication dispensing device of claim 2, wherein the cover tape has machine readable medication identification data thereon.

10. A medication dispensing device, comprising:
    a cartridge housing having a base and a cover;
    a tablet carrier tape having a plurality of tablet pockets, each of the pockets having one opening, the tablet carrier tape having first and second ends that are attached to one another to form a loop;
    a tablet cover tape removably attached to the tablet carrier tape and positioned to cover the openings of the pockets; and
    a rotational member for positioning the tablet carrier tape and having a plurality of actuation surfaces that are configured to engage an actuating device to rotationally advance the tablet carrier tape for radially releasing tablets of medication, the rotational member being positioned between the base and cover of the cartridge housing.

11. The medication dispensing device of claim 10, wherein the first and second ends have predetermined structures that are engageable with one another such that the first and second ends of the tablet carrier tape are releasably attachable to one another.

12. The medication dispensing device of claim 10, wherein a first pocket on the first end of the carrier tape is engageable with a last pocket on the second end of the tablet carrier tape.

13. The medication dispensing device of claim 8, wherein the tablet carrier tape has a registration structure.

14. The medication dispensing device of claim 8, wherein at least one of each of the tablet pockets, except for at least one of the first and last pockets, contain a respective tablet that is retained therein by the tablet cover tape.

15. The medication dispensing device of claim 13, wherein the registration structure is a series of registration apertures in at least one edge of the tablet carrier tape.

16. The medication dispensing device of claim 13, wherein the pockets on the tablet carrier tape are spaced apart by substantially equal separation areas, and wherein the separation areas form the registration structure.

17. The medication dispensing device of claim 13, wherein the tablet pockets are sized to hold a single tablet.

18. The medication dispensing device of claim 10, wherein the base has a slot and wherein at least a portion of the rotating member extends through the slot to expose engageable surfaces to an actuating member.

19. The medication dispensing device of claim 10, wherein the cover includes a tablet retaining wall protruding from a surface thereof.

20. The medication dispensing device of claim 10, wherein, the device further comprises an activation surface to facilitate manual radial dispensing of medication from the device.

21. The medication dispensing device of claim 10, wherein the rotational member is a gear and wherein the actuation surfaces include teeth.

22. The medication dispensing device of claim 10, wherein the base includes a plurality of ratchet protrusions operatively engageable with the rotational member to restrict rotational movement to facilitate single dose radial dispensing of tablets.

23. The medication dispensing device of claim 10 wherein at least the cover tape has machine readable medication identification data that is visible when the cover tape is attached to the carrier tape and when the cover tape is affixed to the cartridge.

24. A method of filling a tablet carrier tape comprising the steps of:
   providing a tablet carrier tape having a plurality of pockets, each of the pockets having one opening;
   filling at least one of the pockets of a predetermined length of the tablet carrier tape with tablets of medication;
   sealing the tablet carrier tape with a tablet cover tape such that the openings of the pockets are covered; and
   attaching a first end of the carrier tape to a second end of the carrier tape such that a loop is formed with the tablet cover tape.

25. The method according to claim 24, wherein in the step of filling the pockets, one of a first pocket on the first end of the tape or a last pocket on a second end of the tape remains empty, and wherein the first pocket on the first end of the tape engages the last pocket on the second end of the tape to thereby attach the first and second ends together.

26. The method according to claim 24, wherein the first end of the tape is glued to the second end of the tape to thereby form the loop.

27. The method according to claim 26, wherein the first and second ends are glued using one of a cold seal adhesive and a heat activated adhesive.

28. The method according to claim 26, wherein the first and second ends are glued using a pressure sensitive adhesive.

29. The medication dispensing device of claim 24, wherein the at least one of the carrier tape and cover tape has machine readable medication identification data.

30. A method of dispensing medication, comprising the steps of:
   determining a medication to be dispensed and a number of tablets of the medication to be dispensed;
   selecting via an identifier associated with a cartridge that contains the medication wherein the cartridge includes a carrier tape with tablets of the medication wherein the carrier tape includes an attached first end and second end of the carrier tape to form a loop; and
   dispensing from the respective carrier tape the determined number of tablets of the determined medication.

31. The method according to claim 30, wherein the carrier tape loop includes one of a first pocket on the first end of the tape or a last pocket on a second end of the tape remaining empty, and wherein the first pocket on the first end of the tape engages the last pocket on the second end of the tape to thereby attach the first and second ends together.

32. The method according to claim 30, wherein the first end of the carrier tape loop is glued to the second end of the carrier tape to thereby form the loop.

33. The method according to claim 32, wherein the first and second ends are glued using one of a cold seal adhesive and a heat activated adhesive.

34. The method according to claim 32, wherein the first and second ends are glued using a pressure sensitive adhesive.

35. The method of claim 30 wherein the step of dispensing includes the step of rotating a rotational member of the cartridge to rotationally advance the carrier tape for radially releasing tablets of medication.

36. The method of claim 35 wherein the step of dispensing includes rotating the rotational member wherein the rotational member includes a carrier tape registration structure that registers the looped carrier tape within the cartridge.

* * * * *